US012785261B2

(12) United States Patent
Wu et al.

(10) Patent No.: US 12,785,261 B2
(45) Date of Patent: Nov. 3, 2026

(54) ANTENNA MODULE AND COMMUNICATION DEVICE

(71) Applicant: HUAWEI TECHNOLOGIES CO., LTD., Shenzhen (CN)

(72) Inventors: Wei Wu, Shanghai (CN); Xiao Zhou, Shanghai (CN); Haibing Xu, Shanghai (CN); Zui Tao, Nanjing (CN); Meiqing Qi, Shanghai (CN); Jie Zhao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 18/951,900

(22) Filed: Nov. 19, 2024

(65) Prior Publication Data

US 2025/0079697 A1 Mar. 6, 2025

Related U.S. Application Data

(63) Continuation of application No. PCT/CN2023/079628, filed on Mar. 3, 2023.

(30) Foreign Application Priority Data

May 20, 2022 (CN) ......................... 202210566932.7

(51) Int. Cl.
*H01Q 1/52* (2006.01)
*H01Q 1/22* (2006.01)
*H01Q 1/48* (2006.01)

(52) U.S. Cl.
CPC ........... *H01Q 1/521* (2013.01); *H01Q 1/2283* (2013.01); *H01Q 1/48* (2013.01)

(58) Field of Classification Search
CPC .......... H01Q 1/48; H01Q 1/521; H01Q 1/243; H01Q 21/28; H01Q 9/42; H01Q 1/38;
(Continued)

(56) References Cited

U.S. PATENT DOCUMENTS 7,385,563 B2 * 6/2008 Bishop ..................... H01Q 1/52 343/834
9,153,873 B2 * 10/2015 Ng ....................... H01Q 21/205
(Continued)

FOREIGN PATENT DOCUMENTS

CN 101159352 A 4/2008
CN 106887678 A 6/2017
(Continued)

OTHER PUBLICATIONS

PCT International Search Report for Application No. PCT/CN2023/079628 dated Mar. 3, 2023, 9 pages.

*Primary Examiner* — Wei (Victor) Y Chan

(57) ABSTRACT

This disclosure provides an antenna module and a communication device. The antenna module includes a ground plane, a first antenna, a second antenna, and a first decoupling structure. A cross-sectional height of the first decoupling structure, a distance between the first decoupling structure and the first antenna, and a distance between the first decoupling structure and the second antenna are set to reduce an amount of coupling between the first antenna and the second antenna. This facilitates a miniaturized design of the antenna module, and improves isolation on a premise thereby ensuring antenna efficiency.

17 Claims, 15 Drawing Sheets

(58) Field of Classification Search
CPC ...... H01Q 5/371; H01Q 9/0421; H01Q 5/378; H01Q 7/00; H01Q 21/08; H01Q 21/24
See application file for complete search history.

(56) References Cited

U.S. PATENT DOCUMENTS

| | | | | |
|---|---|---|---|---|
| 2017/0084985 | A1 | 3/2017 | Ku et al. | |
| 2017/0271759 | A1 * | 9/2017 | Liu | H01Q 9/42 |
| 2020/0044329 | A1 | 2/2020 | Wu et al. | |

FOREIGN PATENT DOCUMENTS

| | | | | |
|---|---|---|---|---|
| CN | 107275799 | A | 10/2017 | |
| CN | 112164888 | A | 1/2021 | |
| CN | 112421229 | A | 2/2021 | |
| CN | 112803146 | A | 5/2021 | |
| CN | 216312056 | U | 4/2022 | |
| JP | H09107233 | A | 4/1997 | |
| JP | H09214241 | A | 8/1997 | |
| WO | WO-2018219070 | A1 * | 12/2018 | H01Q 1/36 |

* cited by examiner

ANTENNA MODULE AND COMMUNICATION DEVICE

CROSS-REFERENCE TO RELATED APPLICATIONS

This application is a continuation of International Application No. PCT/CN2023/079628, filed on Mar. 3, 2023, which claims priority to Chinese Patent Application No. 202210566932.7, filed on May 20, 2022. The disclosures of the aforementioned applications are hereby incorporated by reference in their entireties.

TECHNICAL FIELD

The present disclosure relates to the field of network communication technologies, and in particular, to an antenna module and a communication device.

BACKGROUND

In a MIMO system, namely, a multiple-input multiple-output system, a plurality of transmit and receive antennas are disposed, and specific data processing is performed, to multiply a communication capacity, thereby meeting increasing communication service requirements. In a communication device, different antennas need to not affect each other during working, and port isolation is used to quantify the impact. Higher port isolation indicates smaller mutual impact between two antennas. Generally, a longer distance between two antennas indicates better isolation between the two antennas. However, during actual engineering implementation, a plurality of antennas are placed close to each other due to factors such as space available for the MIMO system and the location of the MIMO system. Consequently, signal coupling between the antennas is strong, and the antennas affect each other, resulting in poor port isolation. Therefore, a decoupling technology needs to be used to eliminate signal coupling between the antennas, to improve port isolation and meet one or more system requirements. Based on different frequency bands of antenna signals, the decoupling technology is classified into intra-frequency decoupling and inter-frequency decoupling. A decoupling technology for two antennas whose operating bands are the same is referred to as intra-frequency decoupling.

For the antenna, an additional decoupling structure usually causes unnecessary degrading of radiation performance. In addition, with a current development trend of miniaturization of electronic components, a decoupling manner of increasing a distance between antenna elements is undesirable.

Therefore, how to implement multi-antenna decoupling in a limited space on a premise of ensuring antenna radiation performance is an interest continuously explored in the industry.

SUMMARY

This disclosure provides an antenna module and a communication device. A decoupling solution is used for the antenna module to implement decoupling of a plurality of antennas in a limited space, thereby ensuring radiation performance of the antenna.

According to a first aspect, an embodiment of this disclosure provides an antenna module, including a ground plane, a first antenna, a second antenna, and a first decoupling structure. A direction perpendicular to the ground plane is a first direction. The first antenna, the second antenna, and the first decoupling structure are disposed on a side of the ground plane in the first direction. An operating frequency of each of the first antenna and the second antenna is a first frequency. The first decoupling structure is configured to reduce an amount of coupling between the first antenna and the second antenna, and a resonance frequency of the first decoupling structure is the first frequency. In the first direction, a longest distance between the first decoupling structure and the ground plane is a cross-sectional height of the first decoupling structure. The cross-sectional height of the first decoupling structure is between 0.04 times a wavelength and 0.16 times the wavelength. A distance between the first decoupling structure and the first antenna is a first distance. A distance between the first decoupling structure and the second antenna is a second distance. Both the first distance and the second distance are between 0.1 times the wavelength and 0.45 times the wavelength.

The first distance is a distance between a phase center of the first decoupling structure and a phase center of the first antenna. The second distance is a distance between the phase center of the first decoupling structure and a phase center of the second antenna. In this disclosure, the first decoupling structure is disposed to implement a small dimension of the antenna. This facilitates a thin design of the communication device, and can further resolve a problem of isolation between the first antenna and the second antenna. The cross-sectional height of the first decoupling structure, the distance between the first decoupling structure and the first antenna, and the distance between the first decoupling structure and the second antenna are controlled, to improve isolation between the first antenna and the second antenna in a limited space and reduce impact on radiation efficiency of the first antenna and the second antenna. There is no obvious dent in a simulation diagram of the radiation efficiency of the first antenna and the second antenna.

In a possible implementation, a distance between the first antenna and the second antenna is between 0.2 times the wavelength and 0.8 times the wavelength. The distance between the first antenna and the second antenna is a distance between the phase center of the first antenna and the phase center of the second antenna. Specifically, in this disclosure, the distance between the first antenna and the second antenna is shortened to save a space of a mainboard, thereby facilitating a design of a small dimension of the antenna module. The distance between the first antenna and the second antenna is between 0.2 times the wavelength and 0.8 times the wavelength. If the first decoupling structure is not disposed in the antenna module, in a resonant state, the first antenna and the second antenna receive signals from each other, resulting in signal interference and poor isolation. Therefore, in this disclosure, the distance between the first antenna and the second antenna is set between 0.2 times the wavelength and 0.8 times the wavelength, and the radiation efficiency of the first antenna and the second antenna is ensured by disposing the first decoupling structure, thereby improving isolation.

In a possible implementation, the first decoupling structure includes a ground end, a first stub, and a second stub. The first stub is connected between the second stub and the ground end. An extension direction of the first stub is the first direction. A joint between the second stub and the first stub is in a T shape. An electrical length from the ground end to a tail end that is of the second stub and that is away from the first stub is 0.25 times the wavelength. This solution provides the first decoupling structure having the low cross-sectional height. Specifically, a connection part between the first stub and the second stub of the first decoupling structure is disposed in the T shape, and the electrical length from the ground end to the tail end that is of the second stub and that is away from the first stub is controlled to be 0.25 times the wavelength. The second stub is bent and extends relative to the first stub. In this way, the electrical length of the first decoupling structure is ensured, and the cross-sectional height of the first decoupling structure can be effectively controlled, thereby facilitating miniaturization of the antenna module and thinning of the communication device.

In a possible implementation, a first lumped element is disposed between the ground end and the first stub. The first lumped element is configured to adjust the resonance frequency of the first decoupling structure, and is configured to adjust the electrical length of the first decoupling structure. The first lumped element is disposed. This further helps implement the low cross-sectional height of the first decoupling structure, and implement miniaturization of the antenna module and thinning of the communication device.

In a possible implementation, the antenna module further includes a second decoupling structure. The second decoupling structure is configured to reduce the amount of coupling between the first antenna and the second antenna. A resonance frequency of the second decoupling structure is higher than the first frequency or lower than the first frequency. In this disclosure, the resonance frequency of the second decoupling structure is adjusted, so that the resonance frequency of the second decoupling structure is not the same as the first frequency, but is slightly higher or lower. This implements decoupling between the first antenna and the second antenna, thereby improving isolation and reducing the impact on the radiation efficiency of the antenna. Specifically, when the second decoupling structure generates resonance, an efficiency dent is generated for an electromagnetic wave at a resonance frequency of the second decoupling structure. For the first antenna and the second antenna, the efficiency dent generated by the second decoupling structure may avoid an in-band frequency (namely, the first frequency) of resonance of the first antenna and the second antenna, to reduce impact of the second decoupling structure on the radiation efficiency of the first antenna and the second antenna.

In a possible implementation, a frequency difference between the resonance frequency of the second decoupling structure and the first frequency is between 0.03 GHz and 0.33 GHz. In a specific implementation, the resonance frequency of the second decoupling structure is limited to a range of (fL−0.33 GHz) to (fL−0.03 GHz) or (fH+0.03 GHz) to (fH+0.33 GHz), so that isolation can be improved and an efficiency dent is not introduced into the band. Herein, fL to fH are a frequency range (namely, the first frequency) of the first antenna and the second antenna. For example, fL to fH are 2.4 GHz to 2.5 GHz.

In a possible implementation, the antenna module further includes a third antenna and a fourth antenna. A radiator of the third antenna is located on a side that is of the first antenna and that is away from the ground plane. A radiator of the fourth antenna is located on a side that is of the second antenna and that is away from the ground plane. An operating frequency of each of the third antenna and the fourth antenna is a second frequency. The second frequency is higher than the first frequency. In this disclosure, the first antenna and the third antenna are integrated on one antenna support and are disposed in a same region corresponding to the mainboard. In addition, the second antenna and the fourth antenna are integrated on one antenna support and are disposed in a same region corresponding to the mainboard. This helps reduce a board area occupied by the antenna module on the mainboard and provide a miniaturized antenna module, and also facilitates the miniaturized design of a communication device.

In a possible implementation, the first antenna and the second antenna are 2.4 G antennas, and the third antenna and the fourth antenna are 5 G antennas. In this disclosure, the 2.4 G antennas are disposed in an arrangement space of the 5 G antennas, and then isolation between the 2.4 G antennas is improved by using the first decoupling structure and the second decoupling structure, and efficiency of the 2.4 G antennas is ensured. Therefore, the first antenna and the second antenna provided in this solution do not additionally occupy an area of the mainboard, and the radiation performance of the first antenna and the second antenna can be ensured.

In a possible implementation, a feed structure of the third antenna and the first antenna are disposed on a same circuit board, and a feed structure of the fourth antenna and the second antenna are disposed on a same circuit board. According to the antenna module provided in this disclosure, the feed structure of the third antenna and the first antenna are disposed on the same circuit board, to provide a specific solution of integrating the first antenna and the third antenna. The first antenna occupies a space on the circuit board on which the feed structure of the third antenna is located. This saves space, and manufacturing is easy at low costs. A Dk value of the circuit board configured to carry the antenna module may be 4.2. In this disclosure, a requirement on a loss of a material of the circuit board configured to carry the antenna module is not high, and df≤0.008, so that low costs can be implemented.

According to a second aspect, an embodiment of this disclosure provides an antenna module, including a ground plane and at least two antenna elements that are disposed adjacent to each other and that are located on a same side of the ground plane. The architectures of the antenna elements are the same. The antenna element includes a first primary antenna and a first decoupling structure. An operating frequency of the first primary antenna is a first frequency. The first decoupling structure is configured to reduce an amount of coupling between the first primary antenna and a first primary antenna of an adjacent antenna element. A resonance frequency of the first decoupling structure is the first frequency. In a direction perpendicular to the ground plane, a longest distance between the first decoupling structure and the ground plane is a cross-sectional height of the first decoupling structure. The cross-sectional height of the first decoupling structure is between 0.04 times a wavelength and 0.16 times the wavelength. A distance between the first decoupling structure and the first primary antenna is a first distance. A distance between the first decoupling structure and the first primary antenna of the adjacent antenna element is a second distance. Both the first distance and the second distance are between 0.1 times the wavelength and 0.45 times the wavelength.

In the antenna module provided in this disclosure, the antenna elements are designed to have a same architecture. In a process of assembling the plurality of antenna elements to a mainboard, a specific structure of each antenna element does not need to be considered, because structures of all the antenna elements are the same. The antenna element needs to be placed only based on a position of a radio frequency chip. Therefore, this implementation helps simplify an assembly process of a communication device, reduce assembly costs, and improve manufacturing efficiency.

In a possible implementation, a distance between the first primary antenna and the first primary antenna of the adjacent antenna element is between 0.2 times the wavelength and 0.8 times the wavelength. Specifically, in this disclosure, the distance between the first primary antennas is shortened to save a space of the mainboard, thereby facilitating a design of a small dimension of the antenna module. The distance between the two first primary antennas is between 0.2 times the wavelength and 0.8 times the wavelength. If the first decoupling structure is not disposed in each antenna element, when the two first primary antennas are in a resonant state, the two first primary antennas receive signals from each other, resulting in signal interference and poor isolation. Therefore, in this disclosure, the distance between the two first primary antennas is set between 0.2 times the wavelength and 0.8 times the wavelength, and the first decoupling structure is disposed to ensure radiation efficiency of the two first primary antennas and improve isolation.

In a possible implementation, the first decoupling structure includes a ground end, a first stub, and a second stub. The first stub is connected between the second stub and the ground end. An extension direction of the first stub is the first direction. A joint between the second stub and the first stub is in a T shape. An electrical length from the ground end to a tail end that is of the second stub and that is away from the first stub is 0.25 times the wavelength. This solution provides the first decoupling structure having the low cross-sectional height. The second stub is bent and extends relative to the first stub. In this way, the electrical length of the first decoupling structure is ensured, and the cross-sectional height of the first decoupling structure can be effectively controlled, thereby facilitating miniaturization of the antenna module and thinning of the communication device.

In a possible implementation, a first lumped element is disposed between the ground end and the first stub. The first lumped element is configured to adjust the resonance frequency of the first decoupling structure, and is configured to adjust the electrical length of the first decoupling structure. The first lumped element is disposed. This further helps implement the low cross-sectional height of the first decoupling structure, and implement miniaturization of the antenna module and thinning of the communication device.

In a possible implementation, the first decoupling structure in each antenna element is connected to a second lumped element. The second lumped element is connected in series between the first decoupling structure and a ground to adjust the resonance frequency of the first decoupling structure. Values of the second lumped elements connected to different antenna elements are different. Positions of different antenna elements are different, and electromagnetic field environments in which the antenna elements are located are different. The different electromagnetic field environments affect the resonance frequency of the first decoupling structure. In this application, the resonance frequency of the first decoupling structure can be fine-tuned by using the second lumped element, to implement consistency of all the antenna elements. Because the structures of the antenna elements are the same and the antenna elements of the same structures are located at different positions, decoupling effects on the antennas are definitely different. To ensure optimal radiation efficiency of the first primary antenna in the plurality of antenna elements, adjustment may be performed by using the second lumped element. It may be understood that the second lumped element is adjusted to compensate for different antenna radiation efficiency caused by an environmental factor, to implement a normalized design of the antenna module and ensure radiation efficiency of all the antennas (the first primary antennas).

In a possible implementation, each antenna element further includes a second decoupling structure. The second decoupling structure is configured to reduce the amount of coupling between the first primary antenna and the first primary antenna of the adjacent antenna element. A resonance frequency of the second decoupling structure is higher than the first frequency or lower than the first frequency.

In a possible implementation, a frequency difference between the resonance frequency of the second decoupling structure and the first frequency is between 0.03 GHz and 0.33 GHz. In a specific implementation, the resonance frequency of the second decoupling structure is limited to a range of (fL−0.33 GHz) to (fL−0.03 GHz) or (fH+0.03 GHz) to (fH+0.33 GHz), so that isolation can be improved and an efficiency dent is not introduced into a band. Herein, fL to fH are a frequency range (namely, the first frequency) of the first antenna and the second antenna. For example, fL to fH are 2.4 GHz to 2.5 GHz.

Alternatively, the second decoupling structure may be connected to a lumped component. The lumped component is connected in series between the second decoupling structure and the ground. The lumped component is disposed on the mainboard, and is configured to adjust the resonance frequency of the second decoupling structure.

In a possible implementation, each antenna element further includes a second primary antenna. A radiator of the second primary antenna is located on a side that is of the first primary antenna and that is away from the ground plane. An operating frequency of the second primary antenna is a second frequency. The second frequency is higher than the first frequency. In this disclosure, the first primary antenna and the second primary antenna are integrated on one antenna support and are disposed in a same region corresponding to the mainboard. This helps reduce a board area occupied by the antenna module on the mainboard and provide a miniaturized antenna module, and also facilitates the miniaturized design of a communication device.

In a possible implementation, the first primary antenna is a 2.4 G antenna, and the second primary antenna is a 5 G antenna.

In a possible implementation, a feed structure of the second primary antenna and the first primary antenna are disposed on a same circuit board. This solution is a specific solution of integrating the first primary antenna and the second primary antenna. The first primary antenna occupies a space on the circuit board on which the feed structure of the second primary antenna is located. This saves a space, and manufacturing is easy at low costs. A Dk value of the circuit board configured to carry the antenna module may be 4.2. In this disclosure, a requirement on a loss of a material of the circuit board configured to carry the antenna module is not high, and df≤0.008, so that low costs can be implemented.

In a possible implementation, the antenna element includes a first circuit board and a second circuit board that are intersected. The first primary antenna and the first decoupling structure are disposed on the first circuit board. The second decoupling structure is disposed on the second circuit board.

According to a third aspect, this disclosure provides a communication device, including a radio frequency chip and the antenna module according to any one of the possible implementations of the first aspect or the second aspect. The radio frequency chip is disposed on a mainboard, and the antenna module is electrically connected to the radio frequency chip through a transmission line on the mainboard. The radio frequency chip is configured to process electromagnetic wave signals received and sent by the antenna module.

BRIEF DESCRIPTION OF DRAWINGS

To describe the technical solutions in embodiments of the present disclosure or in the background more clearly, the following describes the accompanying drawings.

DESCRIPTION OF EMBODIMENTS

Terms in this disclosure are explained as follows.

A wireless AP, namely, an access point, is a wireless access point. Simply speaking, the wireless AP is a wireless switch in a wireless network. The wireless AP is an access point for a mobile terminal user to access a wired network, and has been widely used for network coverage in various scenarios, including enterprise-level scenarios such as education and health care. The wireless AP may be used for home broadband, internal network deployment of an enterprise, and the like, and a wireless coverage range is tens of meters to hundreds of meters. Generally, the wireless AP further has an access point client mode. To be specific, a wireless link may be established between APs, to expand coverage of the wireless network.

In a MIMO, namely, multiple-input multiple-output, technology, a plurality of transmit and receive antennas are used at a transmit end and also at a receive end, to send and receive signals through the plurality of antennas at the transmit end and the receive end, thereby improving communication quality. This can make full use of space resources and implement multiple-input and multiple-output through the plurality of antennas, and can multiply the channel capacity of a system without an increase in spectrum resources and antenna transmit power. The technology has an obvious advantage, and therefore is considered as a core technology of next-generation communication.

The following describes embodiments of the present disclosure with reference to the accompanying drawings.

Figure 1:
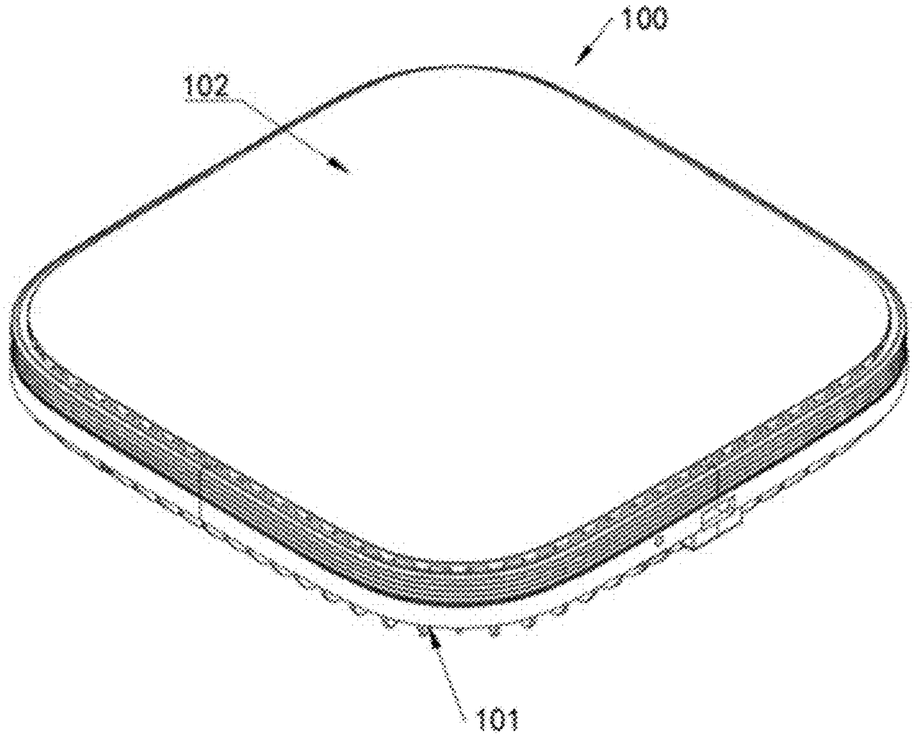
FIG. 1 is an assembly diagram of a communication device in a direction according to an implementation of this disclosure.
Figure 2:
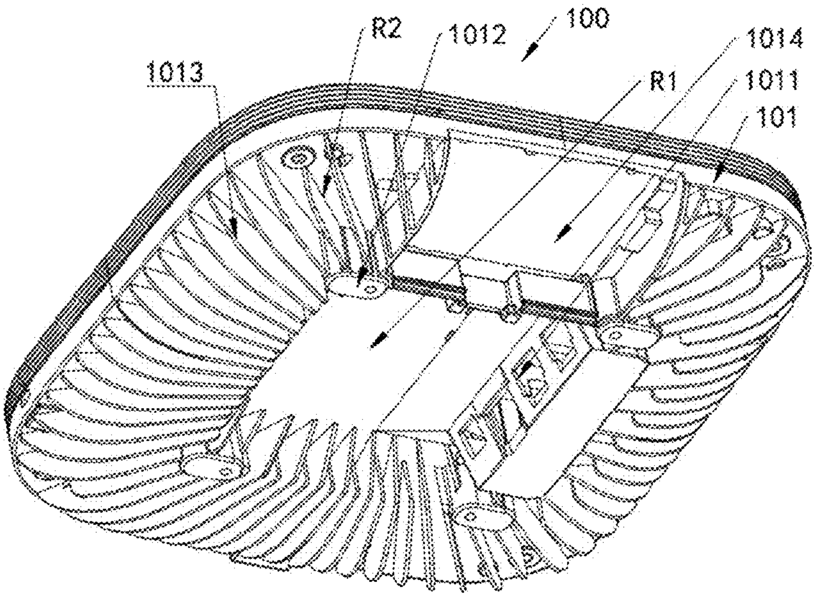
FIG. 2 is an assembly diagram of a communication device in another direction according to an implementation of this disclosure.
Figure 3:
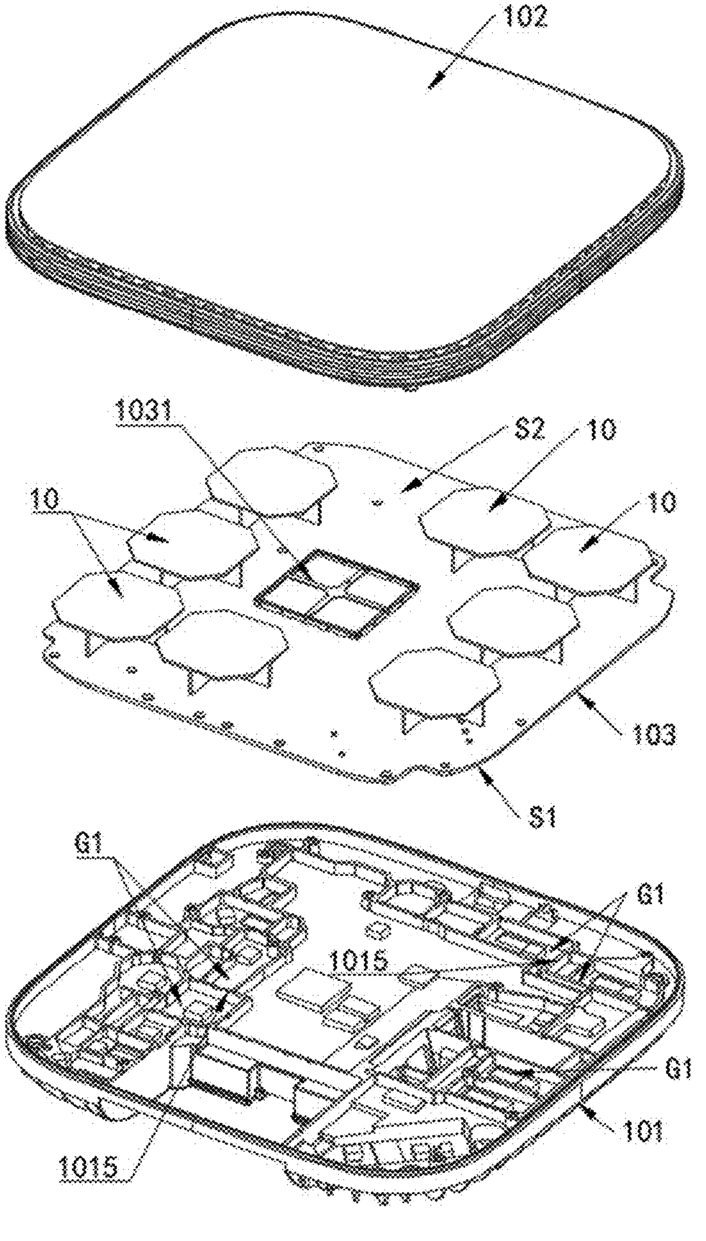
FIG. 3 is a three-dimensional exploded diagram of a communication device according to an implementation of this disclosure.
Figure 4:
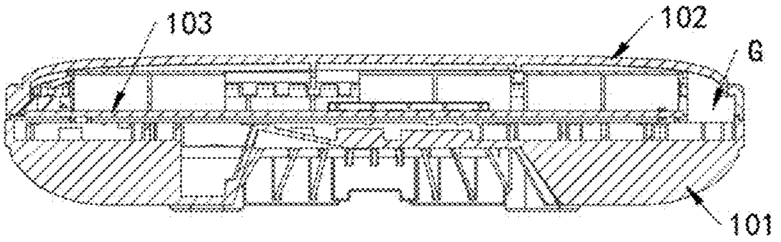
FIG. 4 is a cross-sectional diagram of a communication device according to an implementation of this disclosure.
Figure 5:
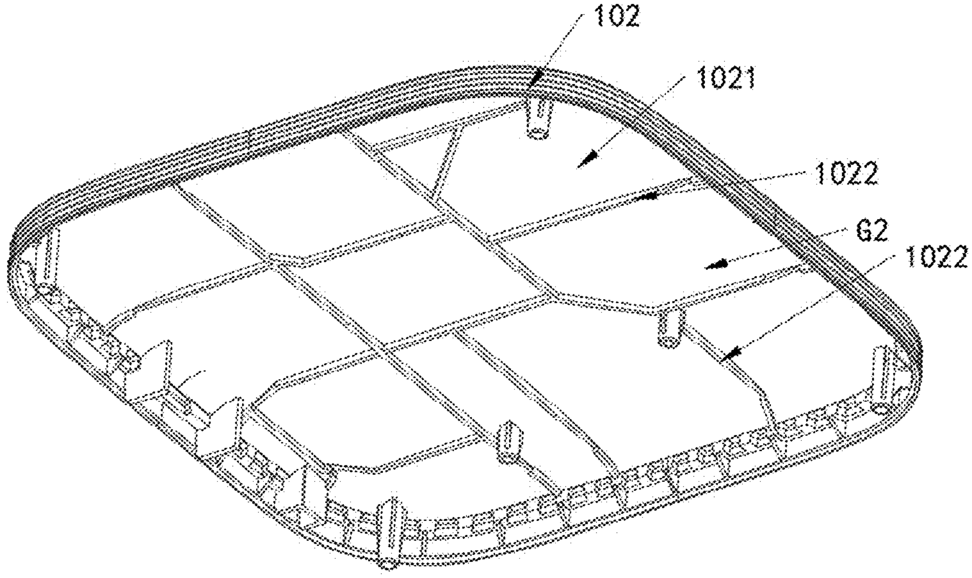
FIG. 5 is a diagram of an inner side of a second housing of a communication device according to an implementation of this disclosure.

FIG. 1 and FIG. 2 each are an assembly diagram of a communication device according to an implementation of this disclosure. FIG. 3 is a three-dimensional exploded diagram of a communication device according to an implementation of this disclosure. FIG. 4 is a cross-sectional diagram of a communication device according to an implementation of this disclosure. FIG. 5 is a diagram of an inner side of a second housing 102 of a communication device according to an implementation of this disclosure.

Refer to FIG. 1, FIG. 2, FIG. 3, and FIG. 4. In an implementation, the communication device 100 is a wireless AP. The communication device 100 includes a first housing 101 and a second housing 102. The first housing 101 and the second housing 102 are fastened to each other and jointly enclosed to form an internal space G of the communication device 100. In an disclosure environment of the communication device 100, the first housing 101 is a bottom housing, and the second housing 102 is a top housing. The first housing 101 is connected to a bearing material. For example, the first housing 101 is in contact with a desktop, a wall, or a support surface of another carrier. A periphery of the second housing 102 is usually provided without a shielding object, and is exposed to air. In an implementation, the first housing 101 is a housing having a conductor material and a shielding function (for example, a metal housing).

Refer to FIG. 2. On an outer surface of the first housing 101, the first housing 101 includes a middle region R1 and an edge region R2 surrounding a periphery of the middle region. The middle region R1 is configured to accommodate a connector socket 1011 (for example, a socket corresponding to a network port or a socket corresponding to an optical fiber port) and accommodate an external cable. A bottom block 1012 is disposed at an intersection of the middle region R1 and the edge region R2. Specifically, the middle region R1 is square, and there are four bottom blocks 1012 that are distributed in four corners of the middle region R1. A heat sink 1013 is disposed in the edge region R2. The heat sink 1013 is configured to dissipate heat for a heat generating element in the communication device. The heat sink 1013 is disposed around a periphery of the connector socket 1011, and the heat sink 1013 includes a plurality of fins. Each fin extends from a junction between the edge region R2 and the middle region R1 to an outer edge of the edge region R2. The edge region R2 is further provided with an opening

1014. The opening 1014 connects the internal space G of the communication device 100 to the outside. The opening 1014 is disposed to mount an internet of things (IoT) card module. An IoT card may be understood as an Internet of Things card, namely, a chip for network access of a device.

Refer to FIG. 3. In a specific implementation, a plurality of accommodation spaces G1 are formed on an inner surface of the first housing 101. Adjacent accommodation spaces G1 are partitioned from each other through a lower partition plate 1015. The plurality of accommodation spaces G1 are disposed independently. The plurality of accommodation spaces G1 are configured to accommodate electronic components of the communication device 100. The accommodation spaces G1 are independent of each other, so that the first housing 101 forms a shielding cover structure for the electronic components. Therefore, the first housing 101 of the communication device 100 provided in this disclosure integrates functions of a housing and a shielding cover. The first housing 101 is combined with a mainboard 103 of the communication device 100. In this way, the first housing 101 forms a plurality of shielding covers disposed on the mainboard 103, to shield different electronic components on the mainboard 103. Therefore, in this disclosure, there is no need to additionally dispose a shielding cover structure between the housing and the mainboard of the communication device 100. This facilitates a thin design of the communication device. The second housing 102 is made of a non-conducting material (for example, plastic). An antenna module is disposed on an inner side of the second housing 102. The second housing 102 is designed as the non-conducting material. This does not affect radiation efficiency of an antenna.

Refer to FIG. 3 and FIG. 4. The mainboard 103 is disposed inside the communication device 100. The mainboard 103 is fastened to the internal space G enclosed by the first housing 101 and the second housing 102. The mainboard 103 includes a bottom surface S1 and a top surface S2. The bottom surface S1 faces the inner surface of the first housing 101, and the top surface S2 faces an inner surface of the second housing 102. The electronic components on the mainboard 103 include a CPU, a CPU peripheral circuit, a plurality of radio frequency chips, a baseband chip, the antenna module, and other functional modules (such as a power supply module, a Bluetooth module, a network port, and an optical fiber port). On the mainboard 103, a main heat generating component and a component that needs electromagnetic shielding are disposed on the bottom surface S1, and the electronic component that needs electromagnetic shielding is correspondingly disposed in the accommodating space G1 that has a function similar to that of a shielding cover and that is formed by the first housing 101. The main heat generating component dissipates heat by using the first housing 101. For example, electronic components such as the CPU, the baseband chip, the radio frequency chip, the power supply module, the Bluetooth module, the network port, the optical fiber port, and an IoT card module are disposed on the bottom surface S1 of the mainboard 103. The antenna module 10 is disposed on the top surface S2 of the mainboard 103. Because the second housing 102 is made of the non-conducting material, a side that is of the antenna module 10 and that is away from the mainboard 103 is a clearance space. This helps ensure antenna performance. The antenna module 10 is disposed in an edge region of the mainboard 103, and a middle region enclosed by the antenna module 10 is configured to accommodate the CPU peripheral circuit.

Refer to FIG. 5. In an implementation, the second housing 102 includes a plate body 1021 and an upper partition plate 1022 that protrudes from an inner surface of the plate body 1021. The upper partition plate 1022 and the plate body 1021 may be an integrated structure. In one aspect, the upper partition plate 1022 is configured to improve strength of the plate body 1021 and ensure flatness of the plate body 1021. In another aspect, the upper partition plate 1022 encloses a plurality of partitioned spaces G2 on the inner surface of the plate body 1021. In an assembled state, antenna elements of the antenna module 10 are disposed corresponding to different partitioned spaces G2. In a direction perpendicular to the mainboard 103, orthographic projections of the antenna elements of the antenna module 10 on the second housing 102 are separately located in the partitioned spaces G2.

Figure 6:
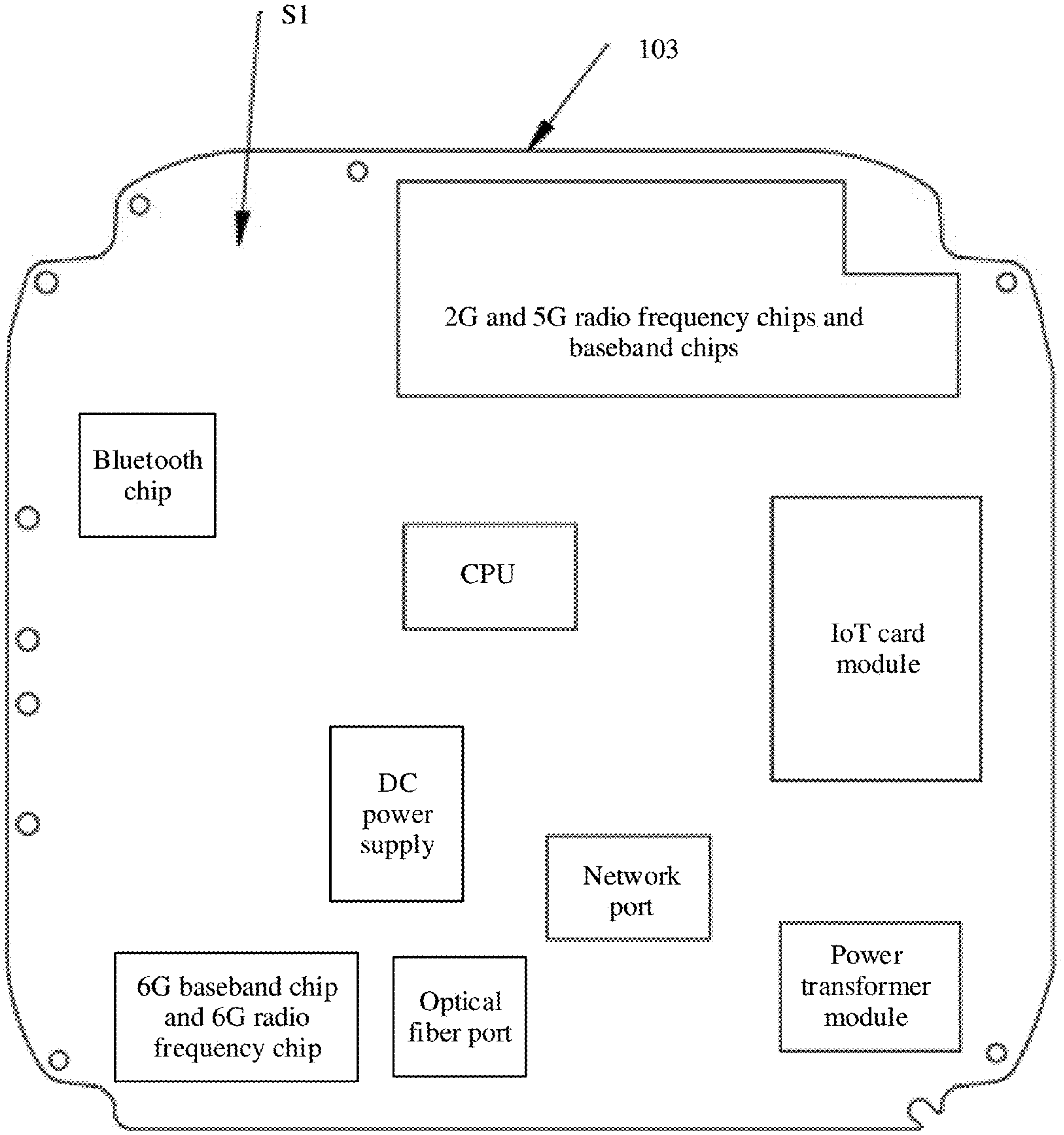
FIG. 6 is a diagram of distribution of at least some electronic components on a bottom surface of a mainboard of a communication device according to an implementation of this disclosure.

Refer to FIG. 6. In an implementation, a CPU located in the middle region is disposed on the bottom surface S1 of the mainboard 103. 2G and 5G radio frequency chips and baseband chips are disposed on the top of the CPU. The radio frequency chip and the baseband chip may be chips independent of each other. A plurality of 2G radio frequency antennas and a plurality of 5G radio frequency chips may be disposed according to an antenna arrangement requirement. Similarly, a plurality of baseband antennas may also be disposed based on an antenna frequency and according to an arrangement requirement. A Bluetooth chip is disposed on the left of the CPU. The IoT card module is disposed on the right of the CPU. A 6G baseband chip, a 6G radio frequency chip, the network port, the optical fiber port, a DC power supply, and a power transformer module are disposed under the CPU. The radio frequency chip and the baseband chip in the 6G baseband chip and the 6G radio frequency chip may be chips independent of each other. For the radio frequency chip, a plurality of 6G radio frequency antennas may be disposed according to an antenna arrangement requirement. Similarly, a plurality of baseband antennas may also be disposed based on an antenna frequency and according to an arrangement requirement. Other electronic components, for example, other processors such as a CPLD logic chip or a PHY chip, may be further disposed in the communication device provided in this disclosure.

As shown in FIG. 3, in this disclosure, the antenna module 10 is directly disposed on the top surface S2 of the mainboard 103, feeder cables of the antennas in the antenna module 10 are directly arranged in the mainboard 103 (for example, microstrips on the mainboard 103 form a feed system), and no additional feeder cable is required. It is assumed that the antenna module 10 is independently fastened to an antenna board. For example, generally, the antenna board may be a metal board and is stacked with the mainboard. The radio frequency chip feeds power to the antenna module through the feeder cable. In this architecture, not only the antenna board occupies a space of the communication device, but also the feeder cable needs to occupy the space of the communication device. In addition, assembly of the antenna board and assembly of the feeder cable complicate an internal structure of the communication device. For a signal of the antenna module, quality of the signal for feeding through the feeder cable is lower than quality of the signal for direct feeding through a cable that is in the mainboard 103 and that is used as a feed structure in this disclosure.

The antenna module 10 provided in this disclosure is a MIMO antenna system. The antenna module 10 includes a plurality of groups of antennas (a plurality of antenna elements). The groups of antennas have different operating frequencies. In general, the antenna module may include two or more antennas working at a first frequency, and two or more antennas working at a second frequency. For example, in an implementation, the antenna module includes three groups of antennas. A first group is first-frequency antennas (for example, a 2.4 G antenna whose operating band is 2.4 GHz to 2.5 GHz), a second group is second-frequency antennas (for example, a 5 G antenna whose operating band is 5.15 GHz to 5.85 GHz), and a third group is third-frequency-band antennas (for example, a 6 G antenna whose operating band is 5.925 GHz to 7.125 GHz). Each group of antennas includes a plurality of independent antennas. The independent antenna means that the antenna has an independent feed power supply and an independent radiator, and can independently perform an antenna function. In a specific implementation, the antenna module includes four 2.4 G antennas, four 5 G antennas, and four 6 G antennas. One antenna element may be provided with one antenna of one frequency (for example, one antenna element includes only one 6 G antenna), or one antenna element may be provided with two antennas of different frequencies. For example, one antenna element includes one 2.4 G antenna and one 5 G antenna.

To ensure working efficiency of all antennas, isolation between an antenna and another antenna needs to be ensured when the antennas are working. Isolation between ports is used to quantify impact between the antennas. Higher isolation between ports indicates smaller impact between two antennas. Generally, a longer distance between antennas indicates better isolation. However, the longer distance between antennas affects a miniaturization design of the communication device. Therefore, a distance between the antennas needs to be shortened, to reduce board space occupied and obtain a communication device of a small size. For low-frequency antennas, a safe distance between two adjacent low-frequency antennas is long. Generally, a plurality of low-frequency antennas are distributed in different corners of a circuit board, to implement isolation between the antennas. However, this is not conducive to a layout of the circuit board. In addition, radio frequency chips connected to the antennas also need to be dispersedly arranged to achieve better antenna performance. If the radio frequency chips are centrally arranged and the antennas are dispersedly arranged, some antennas would be connected to the radio frequency chips through long cables, resulting in a loss of a radio frequency signal.

Refer to FIG. 3. In this disclosure, the antenna module 10 is disposed on the top surface S2 of the mainboard 103, and the antenna module 10 includes a plurality of antenna elements. In a specific implementation, the antenna module 10 includes eight antenna elements. Four of the antenna elements integrate antennas at a first frequency and a second frequency. For example, there are four 2.4 G antennas and four 5 G antennas. In other words, each antenna element includes one antenna at the first frequency and one antenna at the second frequency (which may be understood as follows: One 2.4 G antenna and one 5 G antenna are disposed on one antenna support, and are disposed corresponding to a same position on the mainboard 103). Specifically, in this implementation, the four 2.4 G antennas are disposed adjacent to one another, all the 2.4 G antennas are disposed on a same side of a central region of the mainboard 103, and corresponding positions of the four 2.4 G antennas and the four 5 G antennas on the mainboard 103 are the same. It may be understood that the first frequency is a low frequency, and the second frequency is a high frequency. When antenna performance and isolation are satisfied, a board space occupied by the high-frequency antenna is smaller than a board space occupied by the low-frequency antenna. In this disclosure, the antenna at the second frequency is used as a reference orientation position for an arrangement. When the plurality of antennas at the second frequency are arranged at proper positions, the antenna at the first frequency is disposed at a position of a corresponding antenna at the second frequency, and then isolation and performance of the antennas at the first frequency are adjusted by using a decoupling technology. Such a design can reduce the board space occupied by the antenna module, and is conducive to a small-sized, light, and thin design of the communication device. Specifically, in this disclosure, specific positions of the four 5 G antennas on the mainboard 103 are first set, then the four 2.4 G antennas are disposed on a feed circuit board of the four 5 G antennas, and then a decoupling structure is disposed for the 2.4 G antennas. This ensures isolation between adjacent 2.4 G antennas, and also ensures radiation efficiency of each 2.4 G antenna.

Figure 7:
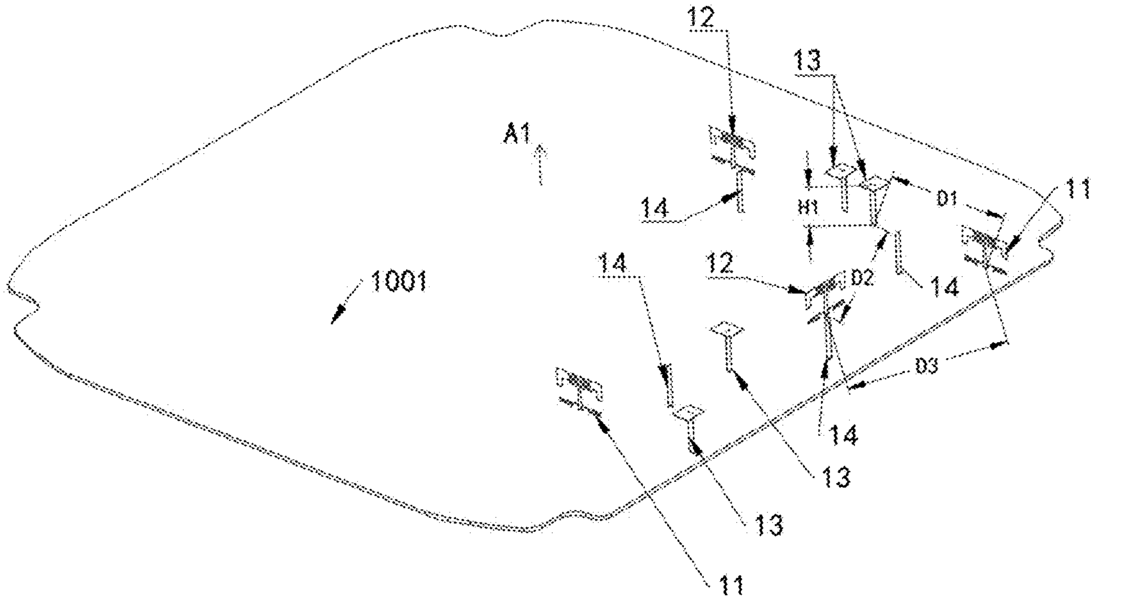
FIG. 7 is a diagram of an antenna module according to an implementation of this disclosure.

FIG. 7 schematically shows an architecture in which an antenna radiator and a decoupling structure of an antenna module 10 in an implementation of this disclosure are arranged. The antenna radiator and the decoupling structure may be metal sheet structures, or may be structures similar to microstrips disposed on a circuit board. FIG. 7 does not include a structure of a support or a circuit board configured to carry an antenna in the antenna module. The radiator and the decoupling structure in the antenna module 10 shown in FIG. 7 may be disposed on a circuit board, and then connected to a mainboard through the circuit board, or may be disposed on an antenna support. The antenna support may be made of an insulation material, and is configured only to carry the antenna radiator and the decoupling structure.

Refer to FIG. 7. In an implementation, the antenna module 10 includes a ground plane 1001, a first antenna 11, a second antenna 12, and a first decoupling structure 13. The ground plane 1001 may be the grounding plane on the mainboard 103 in the implementation shown in FIG. 3, and a direction perpendicular to a plane on which the ground plane 1001 is located is set as a first direction A1. In the first direction A1, the first antenna 11, the second antenna 12, and the first decoupling structure 13 are disposed on a side of the ground plane 1001. Specifically, with reference to FIG. 3, the first antenna 11, the second antenna 12, and the first decoupling structure 13 are located between the mainboard and a second housing 102. An operating frequency of each of the first antenna 11 and the second antenna 12 is a first frequency. For example, the first frequency is 2.4 G. The first decoupling structure 13 is configured to reduce an amount of coupling between the first antenna 11 and the second antenna 12, and a resonance frequency of the first decoupling structure 13 is the first frequency. In the first direction A1, a longest distance between the first decoupling structure 13 and the ground plane 1001 is a cross-sectional height H1 of the first decoupling structure 13. The cross-sectional height H1 of the first decoupling structure 13 is between 0.04 times a wavelength and 0.16 times the wavelength. The wavelength herein is a wavelength of an electromagnetic wave of the first frequency. A distance between the first decoupling structure 13 and the first antenna 11 is a first distance D1. A distance between the first decoupling structure 13 and the second antenna 12 is a second distance D2. Both the first distance D1 and the second distance D2 are between 0.1 times a wavelength and 0.45 times the wavelength. A distance D3 between the first antenna 11 and the second antenna 12 is between 0.2 times the wavelength and 0.8 times the wavelength. The wavelength herein is also the wavelength of the electromagnetic wave of the first frequency. The first distance D1 is a distance between a phase center of the first decoupling structure 13 and a phase center of the first antenna 11. The second distance D2 is a distance between the phase center of the first decoupling structure 13 and a phase center of the second antenna 12. The distance D3 between the first antenna 11 and the second antenna 12 is a distance between the phase center of the first antenna 11 and the phase center of the second antenna 12.

In FIG. 7, the first distance D1, the second distance D2, and the distance D3 between the first antenna 11 and the second antenna 12 are marked on the ground plane 1001. The ground plane 1001 is used as a reference plane for ease of viewing, and the distance does not represent a physical distance between actual marked positions. In this disclosure, the first distance D1, the second distance D2, and the distance D3 between the first antenna 11 and the second antenna 12 are defined as distances between phase centers.

The first antenna 11 and the second antenna 12 are respectively connected to different feed structures, and power is fed to the first antenna 11 and the second antenna 12 through different radio frequency chips. In this way, the first antenna 11 and the second antenna 12 are excited to be in a resonant state of the first frequency. The distance D3 between the first antenna 11 and the second antenna 12 is between 0.2 times the wavelength and 0.8 times the wavelength. If the first decoupling structure 13 is not disposed, in the resonant state, the first antenna 11 and the second antenna 12 receive signals from each other, resulting in signal interference. This causes a decrease in a communication capacity and poor isolation between the antennas. The antenna transmits signals. Isolation between the antennas is a ratio of signals received by another antenna to the signals transmitted by the antenna. In other words, if an antenna receives fewer signals from another antenna, the isolation between the two antennas is better and a degree of interference is lower.

In this disclosure, the first decoupling structure 13 is disposed. This can resolve a problem of isolation between the first antenna 11 and the second antenna 12. The cross-sectional height H1 of the first decoupling structure 13, the distance D1 between the first decoupling structure 13 and the first antenna 11, and the distance D2 between the first decoupling structure 13 and the second antenna 12 are controlled, to improve isolation between the first antenna 11 and the second antenna 12, thereby reducing impact on radiation efficiency of the first antenna 11 and the second antenna 12 Refer to FIG. 18. There is no obvious dent in a simulation diagram of the radiation efficiency of the first antenna 11 and the second antenna 12. Specifically, because the resonance frequency of the first decoupling structure 13 is the same as the operating frequency of the first antenna 11 and the second antenna 12, if the first distance and the second distance are shorter than 0.1 times the wavelength, the first decoupling structure 13 improves isolation between the first antenna 11 and the second antenna 12. However, resonance generated by the first decoupling structure 13 causes an efficiency dent when the first antenna 11 and the second antenna 12 resonate at the operating frequency. In other words, the radiation efficiency of the first antenna 11 and the second antenna 12 at the operating frequency is low, resulting in a weak signal or interruption.

A principle that the efficiency dent occurs on the first antenna 11 and the second antenna 12 at the operating frequency is as follows: At a low section height, a Q value of the first decoupling structure 13 is small, and a loss is large. After electromagnetic waves of the first antenna 11 and the second antenna 12 are received by the first decoupling structure 13, a part of the electromagnetic waves is consumed inside the first decoupling structure 13, and the other part is radiated again and superimposed with radiation fields of the first antenna 11 and the second antenna 12. It can be learned from the first antenna 11 and the second antenna 12 that some energy is lost (consumed by the first decoupling structure 13). As a result, the efficiency dent occurs. In this disclosure, the cross-sectional height H1 of the first decoupling structure 13 is controlled to implement a small dimension of the antenna, thereby facilitating a thin design of a communication device. The distance D1 between the first decoupling structure 13 and the first antenna 11 and the distance D2 between the first decoupling structure 13 and the second antenna 12 are controlled, to reduce the impact of the first decoupling structure 13 on the radiation efficiency of the first antenna 11 and the second antenna 12.

Refer to FIG. 7. In a possible implementation, the antenna module 10 further includes a second decoupling structure 14. The second decoupling structure 14 is configured to reduce the amount of coupling between the first antenna 11 and the second antenna 12. A resonance frequency of the second decoupling structure 14 is higher than the first frequency or lower than the first frequency. A frequency difference between the resonance frequency of the second decoupling structure 14 and the first frequency is between 0.03 GHz and 0.33 GHz. The resonance frequency of the second decoupling structure 14 is limited to a range of (fL−0.33 GHz) to (fL−0.03 GHz) or (fH+0.03 GHz) to (fH+0.33 GHz), so that isolation can be improved and an efficiency dent is not introduced into the band. Herein, fL to fH are a frequency range (namely, the first frequency) of the first antenna 11 and the second antenna 12. For example, fL to fH are 2.4 GHz to 2.5 GHz.

In this disclosure, the resonance frequency of the second decoupling structure 14 is adjusted, so that the resonance frequency of the second decoupling structure is not the same as the first frequency, but is slightly higher or lower. This implements decoupling between the first antenna and the second antenna, thereby improving isolation and reducing the impact on the radiation efficiency of the antenna. When the second decoupling structure 14 generates resonance, an efficiency dent is generated for an electromagnetic wave at a resonance frequency of the second decoupling structure 14. For the first antenna 11 and the second antenna 12, the efficiency dent generated by the second decoupling structure 14 may avoid an in-band frequency (namely, the first frequency) of resonance of the first antenna 11 and the second antenna 12, to reduce impact of the second decoupling structure 14 on the radiation efficiency of the first antenna 11 and the second antenna 12.

The second decoupling structure 14 may be used as an auxiliary decoupling solution for the first decoupling structure 13. The second decoupling structure 14 and the first decoupling structure 13 are combined in one antenna module 10, so that isolation between the first antenna 11 and the second antenna 12 can be effectively implemented and the radiation efficiency of the first antenna 11 and the second antenna 12 can be ensured.

A distance between the second decoupling structure 14 and the first antenna 11 is 0.05 times the wavelength to 0.6 times the wavelength. A distance between the second decoupling structure 14 and the second antenna 12 is 0.05 times the wavelength to 0.6 times the wavelength. The distance between the second decoupling structure 14 and the first antenna 11 may be shorter than the first distance D1.

Similarly, a distance between the second decoupling structure 14 and the second antenna 12 may be shorter than the second distance D2.

Quantities and specific positions of the first antenna 11 and the second antenna 12 are not limited in this disclosure. In the implementation shown in FIG. 7, there are four antennas whose resonance frequencies are the first frequency. Two first antennas 11 and two second antennas 12 are schematically marked in FIG. 7. One of any two adjacent antennas may be used as a first antenna, and the other antenna is a second antenna.

Figure 8:
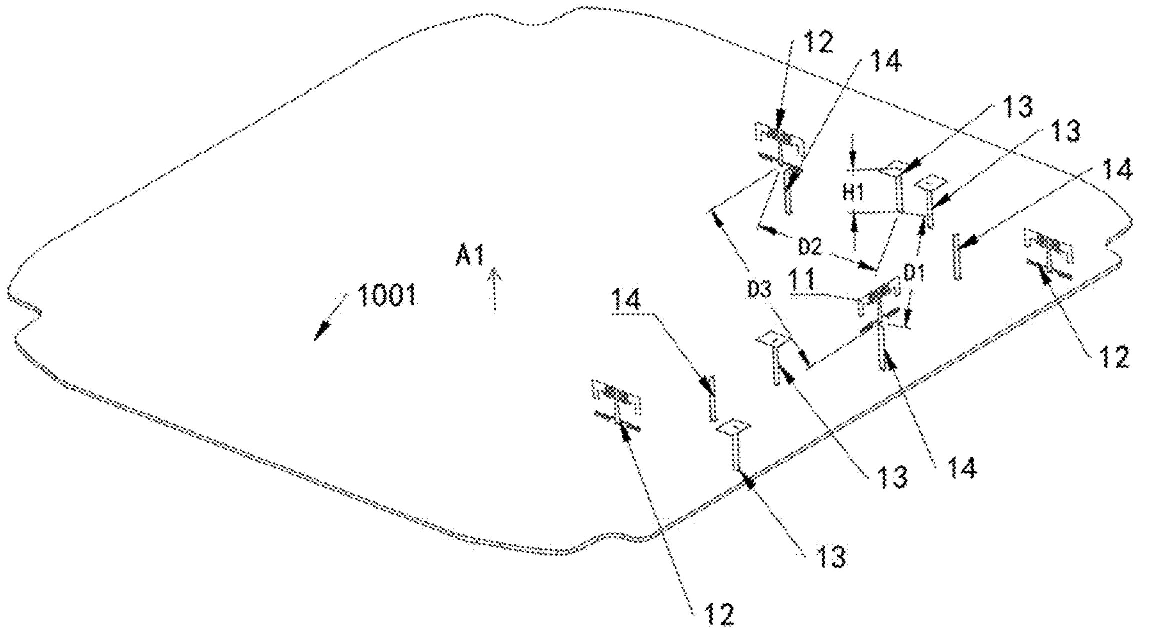
FIG. 8 is a diagram of an antenna module according to an implementation of this disclosure.

Refer to FIG. 8. One antenna in the middle is used as the first antenna 11, and all the other three antennas may be the second antennas 12.

Figure 9:
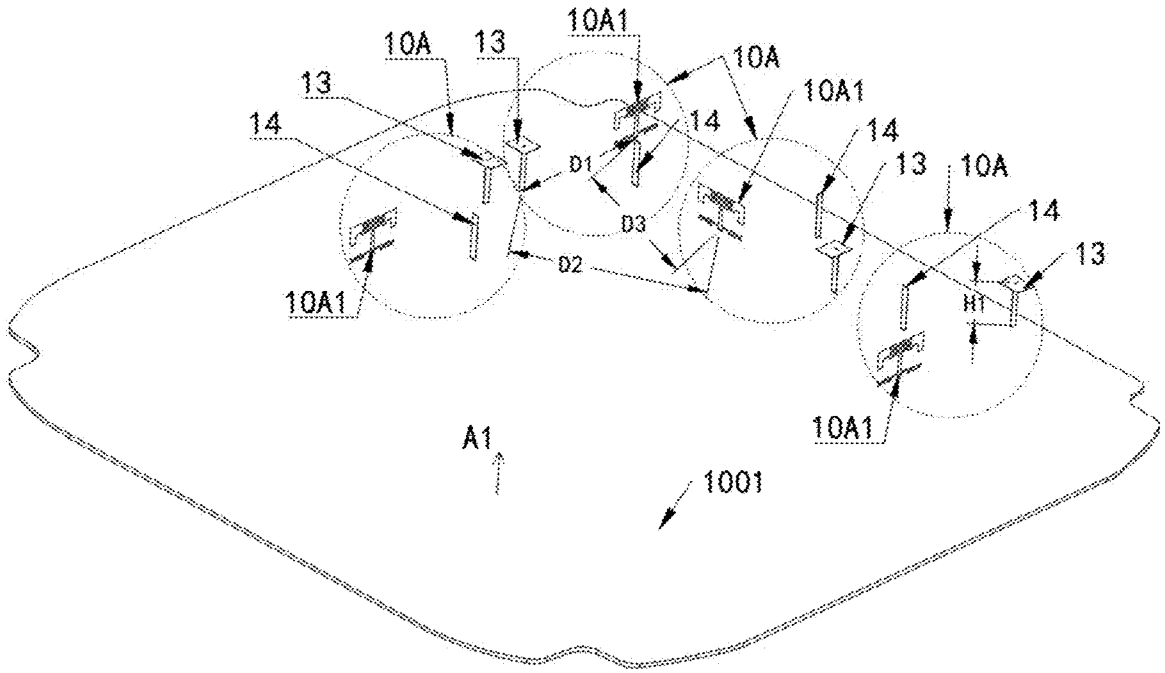
FIG. 9 is a diagram of an antenna module according to an implementation of this disclosure.

Refer to FIG. 9. In an implementation, the antenna module 10 provided in this disclosure includes a ground plane 1001 and at least two adjacent antenna elements 10A that are disposed on a same side of the ground plane 1001. In the implementation shown in FIG. 9, the antenna module 10 includes five antenna elements 10A, and a part in each dashed circle indicates one antenna element 10A. Architectures of the antenna elements 10A are the same, and the architecture of each antenna element 10A is described as follows.

The antenna element 10A includes a first primary antenna 10A1 and a first decoupling structure 13. An operating frequency of the first primary antenna 10A1 is a first frequency. The first decoupling structure 13 is configured to reduce an amount of coupling between the first primary antenna 10A1 and a first primary antenna 10A1 of an adjacent antenna element 10A. A resonance frequency of the first decoupling structure 13 is the first frequency. In a direction (the first direction A1) perpendicular to the ground plane 1001, a longest distance between the first decoupling structure 13 and the ground plane 1001 is a cross-sectional height H1 of the first decoupling structure 13. The cross-sectional height H1 of the first decoupling structure 13 is between 0.04 times a wavelength and 0.16 times the wavelength. A distance between the first decoupling structure 13 and the first primary antenna 10A1 is a first distance D1. A distance between the first decoupling structure 13 and a first primary antenna 10A1 of an adjacent antenna element 10A is a second distance D2. Both the first distance D1 and the second distance D2 are between 0.1 times the wavelength and 0.45 times the wavelength. A distance D3 between the first primary antenna 10A1 and a first primary antenna 10A1 of an adjacent antenna element 10A is between 0.2 times the wavelength and 0.8 times the wavelength.

Each antenna element 10A further includes a second decoupling structure 14. The second decoupling structure 14 is configured to reduce an amount of coupling between the first primary antenna 10A1 and the first primary antenna 10A1 of the adjacent antenna element 10A. A resonance frequency of the second decoupling structure 14 is higher than the first frequency or lower than the first frequency. A frequency difference between the resonance frequency of the second decoupling structure 14 and the first frequency is between 0.03 GHz and 0.33 GHz. The resonance frequency of the second decoupling structure 14 is limited to a range of (fL−0.33 GHz) to (fL−0.03 GHz) or (fH+0.03 GHz) to (fH+0.33 GHz), so that isolation can be improved and an efficiency dent is not introduced into the band. Herein, fL to fH are a frequency range (namely, the first frequency) of the first primary antenna 10A1. For example, fL to fH are 2.4 GHz to 2.5 GHz.

A distance between the second decoupling structure 14 and the first primary antenna 10A1 is 0.05 times the wavelength to 0.6 times the wavelength. The distance between the second decoupling structure 14 and the first primary antenna 10A1 may be shorter than the distance between the first decoupling structure 13 and the first primary antenna 10A1 (the first distance D1), or may be shorter than the distance between the first decoupling structure 13 and the first primary antenna 10A1 of the adjacent antenna element 10A (the second distance D2).

In this implementation, the first decoupling structure 13 and the second decoupling structure 14 improve isolation between the first primary antenna 10A1 of the antenna element 10A and the first primary antenna of the adjacent antenna element 10A, and can ensure radiation efficiency of the first primary antenna 10A1 of the antenna element 10A. A principle is the same as the principle in the implementation shown in FIG. 7, and details are not described again.

In the implementation shown in FIG. 9, the first primary antenna 10A1, the first decoupling structure 13, and the second decoupling structure 14 in each antenna element 10A may be disposed on an antenna support or a circuit board, so that each antenna element 10A forms an integrated architecture. In a process of assembling a plurality of antenna elements 10A to a mainboard 103, a specific structure of each antenna element 10A does not need to be considered, because structures of all the antenna elements 10A are the same. The antenna element 10A needs to be placed only based on a position of a radio frequency chip. Therefore, this implementation helps simplify an assembly process of the communication device, reduce assembly costs, and improve manufacturing efficiency.

Figure 10:
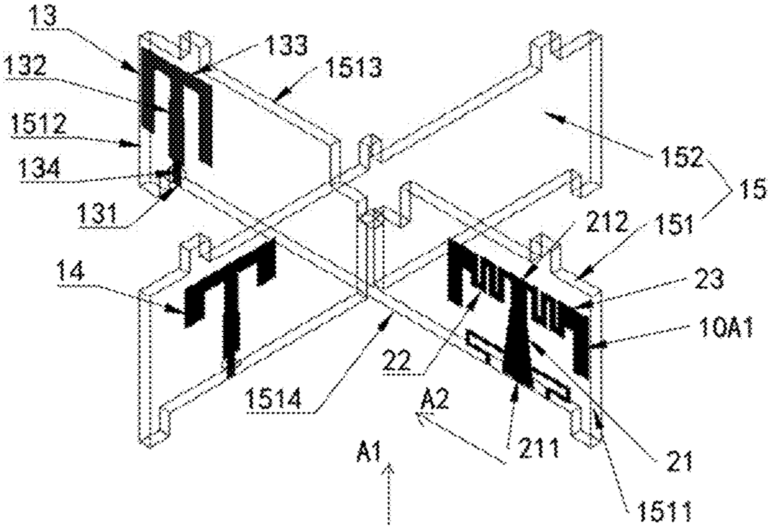
FIG. 10 is a diagram of an antenna element in an antenna module according to an implementation of this disclosure.

Refer to FIG. 10. In an implementation, each antenna element 10A in the antenna module 10 provided in this disclosure is disposed on a support 15 including a circuit board. The support 15 includes a first circuit board 151 and a second circuit board 152, and both the first circuit board 151 and the second circuit board 152 are circuit boards. The first circuit board 151 and the second circuit board 152 are cross-assembled to form a cross-shaped support 15. The first primary antenna 10A1 and the first decoupling structure 13 are disposed on the first circuit board 151. The first circuit board 151 includes a first edge 1511 and a second edge 1512 that are disposed opposite to each other, and a top edge 1513 and a bottom edge 1514 that are connected between the first edge and the second edge. The first primary antenna 10A1 is disposed adjacent to the first edge 1511 of the first circuit board 151, and the first decoupling structure 13 is disposed adjacent to the second edge 1512 of the first circuit board 151. With reference to FIG. 3, the support 15 is mounted on the mainboard 103, the bottom edge 1514 is in contact with a surface of the mainboard 103, and the top edge 1513 is located at an end that is of the support 15 and that is away from the mainboard 103. The second decoupling structure 14 is disposed on the second circuit board 152. In this disclosure, the first primary antenna 10A1, the first decoupling structure 13, and the second decoupling structure 14 are disposed by using the antenna support constructed by the first circuit board 151 and the second circuit board 152. This can ensure that the distance between the first decoupling structure 13 and the first primary antenna 10A1 is between 0.1 times the wavelength and 0.45 times the wavelength. The distance between the second decoupling structure 14 and the first primary antenna 10A1 may be shorter than the distance between the first decoupling structure 13 and the first primary antenna 10A1. In addition, the first primary antenna 10A1, the first decoupling structure 13, and the second decoupling structure 14 can be manufactured on the first circuit board 151 and the second circuit board 152. This implements low manufacturing costs and a light weight by using only a circuit board manufacturing process.

In an implementation, the first primary antenna 10A1 includes a first segment 21, a second segment 22, and a third segment 23. The first segment 21 extends from the bottom edge 1514 to the top edge 1513 of the first circuit board 151, and the first segment 21 extends in the first direction A1. The first segment 21 includes a feed end 211 located at a position of the bottom edge 1514 and a distal end 212 close to the top edge 1513. The second segment 22 and the third segment 23 are distributed on two sides of the distal end 212 in a second direction A2. The second direction A2 is a direction of a vertical connection line between the first edge 1511 and the second edge 1512. The second segment 22 and the third segment 23 have a same structural form, and are symmetrically distributed on two sides of the first segment 21. An overall form of the second segment 22 and the third segment 23 is L-shaped. The first primary antenna 10A1 further includes a fourth segment 24 and a fifth segment 25. The fourth segment 24 and the fifth segment 25 are connected between the first segment 21 and the ground. The fourth segment 24 and the fifth segment 25 are the same and symmetrically distributed on two sides of the first segment 21. The fourth segment 24 and the fifth segment 25 are disposed close to the bottom edge 1514 of the first circuit board 151.

The phase center of the first primary antenna 10A1 may be determined based on a simulation diagram of the antenna. For example, the phase center of the first primary antenna 10A1 may be located at a central position of the first segment 21. A phase center of another antenna or decoupling structure in the antenna module may also be obtained according to a same method.

In an implementation, the first decoupling structure 13 as a whole may be a T-shaped structure, a straight-line structure, or in another form. Refer to FIG. 10. The first decoupling structure 13 includes a ground end 131, a first stub 132, and a second stub 133. The first stub 132 is connected between the second stub 133 and the ground end 131. An extension direction of the first stub 132 is the first direction A1. An extension direction of the second stub 133 is different from the extension direction of the first stub 132. It may be understood that the second stub 133 is bent and extends relative to the first stub 132. This implements a low section of the first decoupling structure 13 and ensures an electrical length. In a specific implementation, a joint between the second stub 133 and the first stub 132 is T-shaped, and an end that is of the first stub 132 and that is away from the ground end 131 is connected to a middle part of the second stub 133. An electrical length between the ground end 131 and a tail end that is of the second stub 133 and that is away from the first stub 132 is 0.25 times the wavelength. Parts that are of the second stub 133 and that are distributed on two sides of the first stub 132 are all L-shaped. This solution provides the first decoupling structure 13 having the low cross-sectional height. Specifically, a connection part between the first stub 132 and the second stub 133 of the first decoupling structure 13 is disposed in a T shape. The electrical length from the ground end to the tail end that is of the second stub 133 and that is away from the first stub 132 is controlled to be 0.25 times the wavelength. The second stub 133 is bent and extends relative to the first stub 132. In this way, the electrical length of the first decoupling structure 13 is ensured, and the cross-sectional height H1 of the first decoupling structure 13 can be effectively controlled.

A first lumped element 134 may be disposed between the ground end 131 and the first stub 132. The first lumped element 134 is configured to adjust the resonance frequency of the first decoupling structure 13, and is configured to adjust the electrical length of the first decoupling structure 13. The first lumped element 134 is disposed. This further helps implement the low cross-sectional height of the first decoupling structure 13. The first lumped element 134 may be an inductor, a capacitor, and/or a resistor mounted on the first circuit board 151 by using an SMT.

A specific structure form of the second decoupling structure 14 may be the same as that of the first decoupling structure 13, or there may be another structure form. This is not limited in this disclosure.

Figure 11:
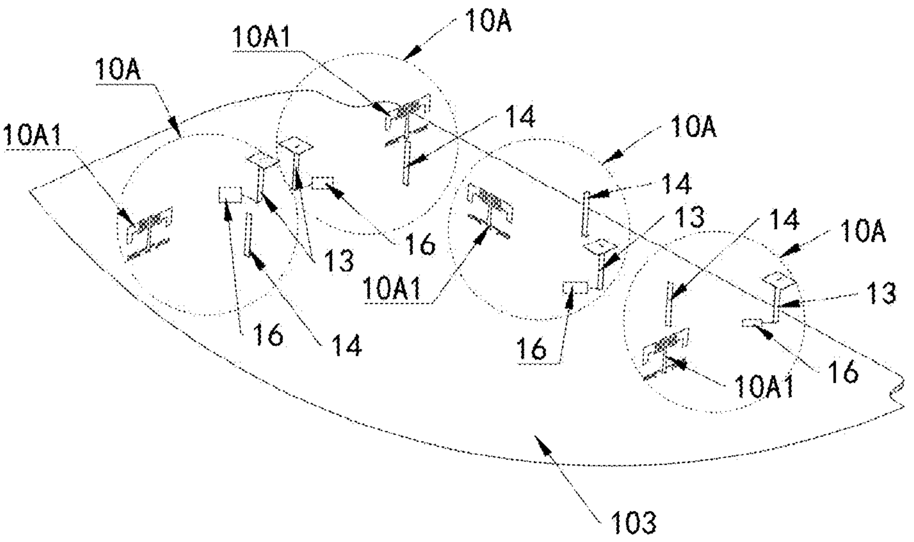
FIG. 11 is a diagram of an antenna module according to an implementation of this disclosure.
Figure 12:
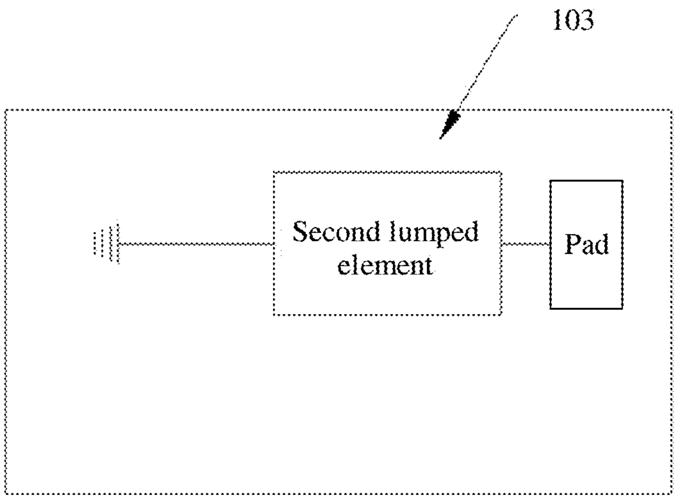
FIG. 12 is a diagram of a second lumped element disposed on a mainboard in an antenna module according to an implementation of this disclosure.

Refer to FIG. 11 and FIG. 12. The first decoupling structure 13 in each antenna element 10A is connected to a second lumped element 16. The second lumped element 16 is connected in series between the first decoupling structure 13 and the ground to adjust the resonance frequency of the first decoupling structure 13, to compensate for impact of the resonance frequency of the first decoupling structure 13 caused by different electromagnetic field environments. The second lumped element 16 is configured to work with the first decoupling structure 13 to reduce the amount of coupling between adjacent first primary antennas 10A1. The second lumped element 16 may be an inductor, a capacitor, and/or a resistor mounted on the mainboard 103 by using an SMT. As shown in FIG. 12, a pad is disposed on the mainboard 103. The pad is configured to electrically connect to the first decoupling structure 13, and the second lumped element 16 is disposed on the mainboard 103 and electrically connected between the pad and a ground (which may be a grounding plane on the mainboard 103).

Values of the second lumped elements 16 connected to different antenna elements 10A are different. Specifically, positions of different antenna elements 10A are different, and electromagnetic field environments in which the antenna elements 10A are located are different. Because the structures of the antenna elements 10A are the same and the antenna elements 10A of the same structures are located at different positions, decoupling effects on the antennas are definitely different. To ensure optimal radiation efficiency of the first primary antenna 10A1 in the plurality of antenna elements 10A, adjustment may be performed by using the second lumped element 16. It may be understood that the second lumped element 16 is adjusted to compensate for different antenna radiation efficiency caused by an environmental factor, to implement a normalized design of the antenna module and ensure radiation efficiency of all the antennas (the first primary antennas 10A1).

Similarly, the second decoupling structure 14 may also be connected to a lumped component. A disposing manner of the lumped component is the same as a disposing manner of the second lumped element 16 shown in FIG. 12. The lumped component is connected in series between the second decoupling structure 14 and the ground, and is configured to adjust the resonance frequency of the second decoupling structure 14, to compensate for impact of the resonance frequency of the second decoupling structure 14 caused by different electromagnetic field environments.

Figure 13:
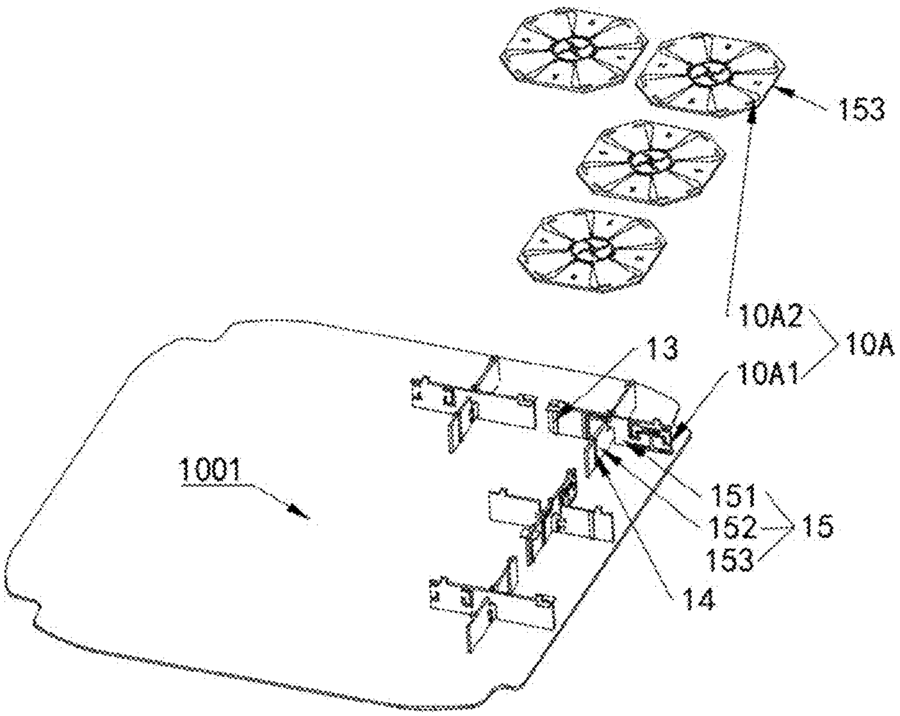
FIG. 13 is an exploded diagram of an antenna module according to an implementation of this disclosure.

FIG. 13 is an exploded diagram of the antenna module. Each antenna element 10A further includes a second primary antenna 10A2. A radiator of the second primary antenna 10A2 is located on a side that is of the first primary antenna 10A1 and that is away from the ground plane 1001. An operating frequency of the second primary antenna 10A2 is a second frequency. The second frequency is higher than the first frequency. The first primary antenna 10A1 is a 2.4 G antenna, and the second primary antenna 10A2 is a 5 G antenna. The radiator of the second primary antenna 10A2 is disposed on the third circuit board 153, and the third circuit board is mounted on the top of the first circuit board 151 and the second circuit board 152. In other words, in this implementation, the support 15 of the antenna element 10A includes the first circuit board 151, the second circuit board 152, and the third circuit board 153. A feed structure of the second primary antenna 10A2 may be disposed on the first circuit board 151 or the second circuit board 152. In a specific implementation, the feed structure of the second primary antenna 10A2 and the first primary antenna 10A1 may be disposed on a same circuit board. The second primary antenna 10A2 feeds power through a radio frequency chip disposed on the mainboard 103. A radio frequency chip corresponding to the second primary antenna 10A2 may be a 5G radio frequency chip, and a radio frequency chip corresponding to the first primary antenna 10A1 may be a 2G radio frequency chip.

Figure 14:
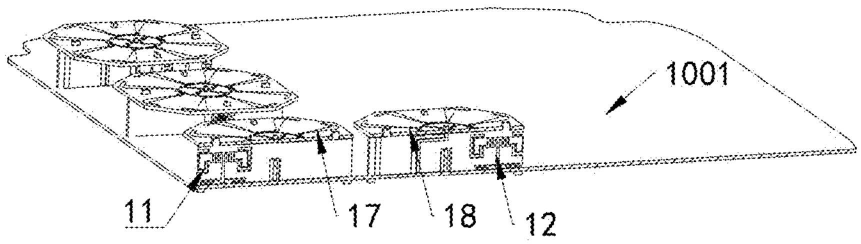
FIG. 14 is a diagram of an antenna module according to an implementation of this disclosure.

Refer to FIG. 14. An implementation shown in FIG. 14 is an extension based on the implementation in FIG. 7. Based on the first antenna 11 and the second antenna 12, the antenna module 10 further includes a third antenna 17 and a fourth antenna 18. A radiator of the third antenna 17 is located on a side that is of the first antenna 11 and that is away from the ground plane 1001. A radiator of the fourth antenna 18 is located on a side that is of the second antenna 12 and that is away from the ground plane 1001. An operating frequency of each of the third antenna 17 and the fourth antenna 18 is the second frequency. The second frequency is higher than the first frequency. For example, the first antenna 11 and the second antenna 12 are 2.4 G antennas, and the third antenna 17 and the fourth antenna 18 are 5 G antennas. In this application, the first antenna and the third antenna are integrated on one antenna support and are disposed in a same region corresponding to the mainboard. In addition, the second antenna and the fourth antenna are integrated on one antenna support and are disposed in a same region corresponding to the mainboard. This helps reduce a board area occupied by the antenna module on the mainboard and provide a miniaturized antenna module, and also facilitates the miniaturized design of a communication device. In this disclosure, the 2.4 G antennas are disposed in an arrangement space of the 5 G antennas, and then isolation between the 2.4 G antennas is improved by using the first decoupling structure and the second decoupling structure, and efficiency of the 2.4 G antennas is ensured. Therefore, the first antenna and the second antenna provided in this solution do not additionally occupy an area of the mainboard, and the radiation performance of the first antenna and the second antenna can be ensured.

In a specific implementation, a feed structure of the third antenna 17 and the first antenna 11 are disposed on a same circuit board, and a feed structure of the fourth antenna 18 and the second antenna 12 are disposed on a same circuit board.

An electrical dimension of the first decoupling structure 13 of the antenna module 10 provided in this disclosure may be less than 0.04λ*0.05λ*0.1λ. Herein, λ is a wavelength of the electromagnetic wave of the first frequency. A Dk value of the circuit board configured to carry the antenna module 10 may be 4.2. In this disclosure, a requirement on a loss of a material of the circuit board configured to carry the antenna module 10 is not high, and df≤0.008, so that low costs can be implemented.

Dk is short for dielectric constant. Dk is referred to as permittivity, a dielectric constant, or a dielectric coefficient, and is a coefficient indicating an insulation capability and is denoted by the letter ε. During engineering application, the dielectric constant is often expressed in a form of relative dielectric constant instead of absolute value, and is commonly used for calculating impedance and a delay.

Df is short for dissipation factor. Df is referred to as a dielectric loss factor, a damping factor, internal dissipation, or a loss tangent, is a tangent of a phase difference angle between strain and a stress period under an action of an alternating force field, and is equal to a ratio of a loss modulus of a material to an energy storage modulus (which is generally referred to as a ratio of energy that has been leaked from an insulation plate in a signal line to energy that still exists in the line).

Figure 15:
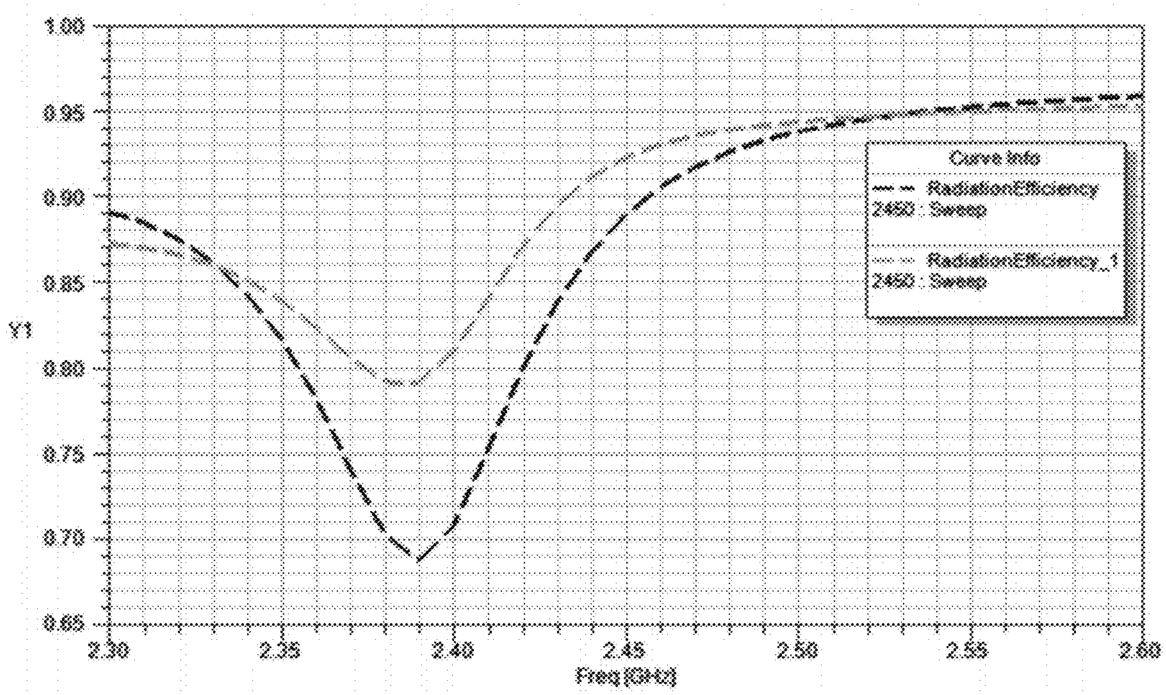
FIG. 15 is a diagram of curves of antenna efficiency of an antenna module in the conventional technology.

In an antenna module in the conventional technology, a decoupling element is placed between two to-be-decoupled 2.4 G antennas at a height of 0.1λ to meet an isolation requirement. However, radiation efficiency dents occur on both of the antennas. In other words, the decoupling structure absorbs some electromagnetic energy. Refer to FIG. 15. It can be learned from the diagram of curves of antenna efficiency shown in FIG. 15 that obvious radiation efficiency dents exist between 2.35 G and 2.4 G of the two antennas.

Figure 16:
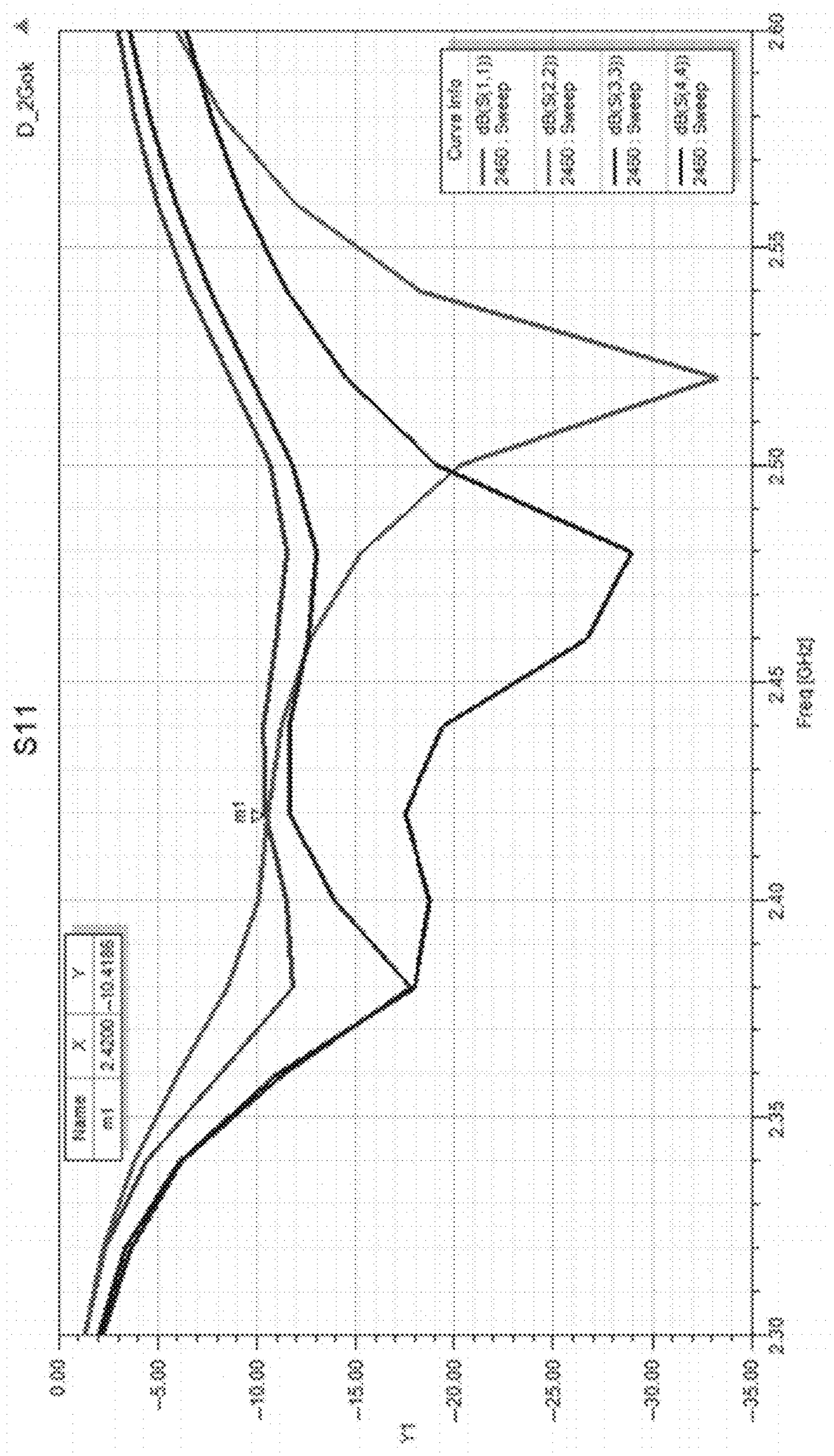
FIG. 16 is a diagram of curves of matching statuses of four antennas in an antenna module according to an implementation of this disclosure.

Refer to FIG. 16. The diagram of curves shown in FIG. 16 is a diagram of matching statuses of four 2.4 G antennas in the antenna module 10 according to this disclosure. It can be learned from FIG. 16 that a matching status of each working antenna meets an industrial standard requirement, for example, is less than −10 dB. It may be understood that most electromagnetic wave energy enters the antenna, and only a few electromagnetic waves are reflected outside the antenna. Therefore, when isolation of the antenna module provided in this disclosure is improved, antenna matching can be ensured. In other words, efficiency of the antenna is maintained in a good state.

Figure 17:
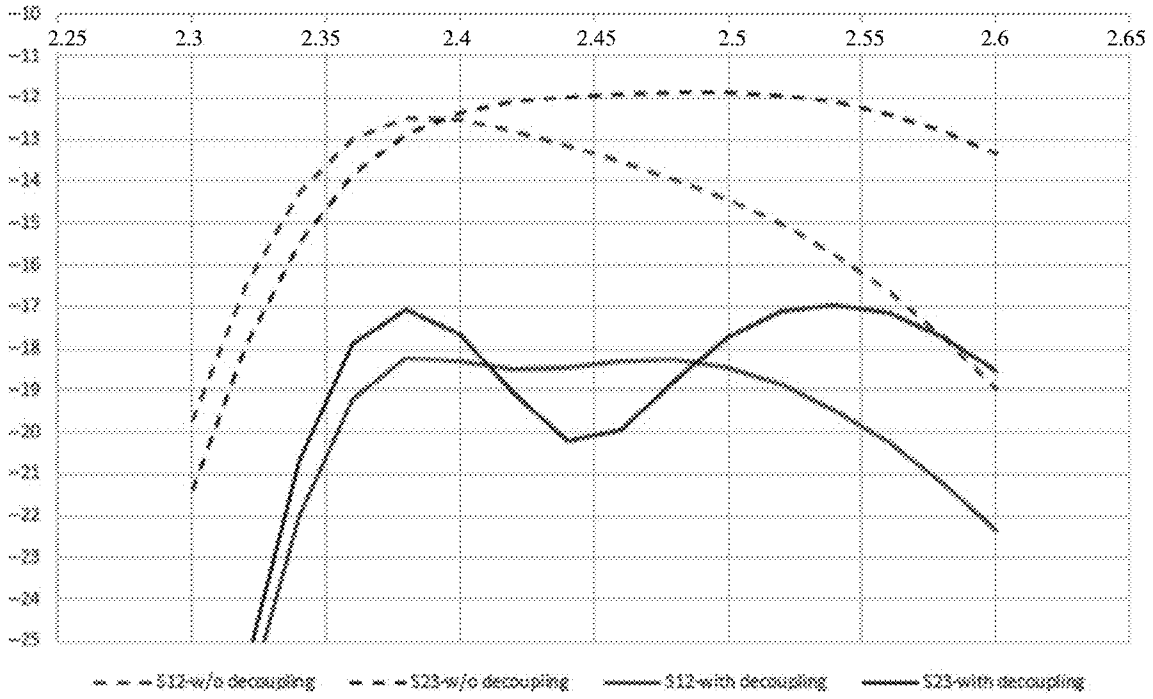
FIG. 17 is a diagram of curves of isolation between four antennas in an antenna module according to an implementation of this disclosure.

Refer to FIG. 17. The diagram of curves shown in FIG. 17 shows isolation of four 2.4 G antennas of the antenna module 10 provided in this disclosure. As shown in FIG. 17, when a spacing between 2.4 G antennas is 0.36λ, isolation increases from 12 dB to 18 dB.

Figure 18:
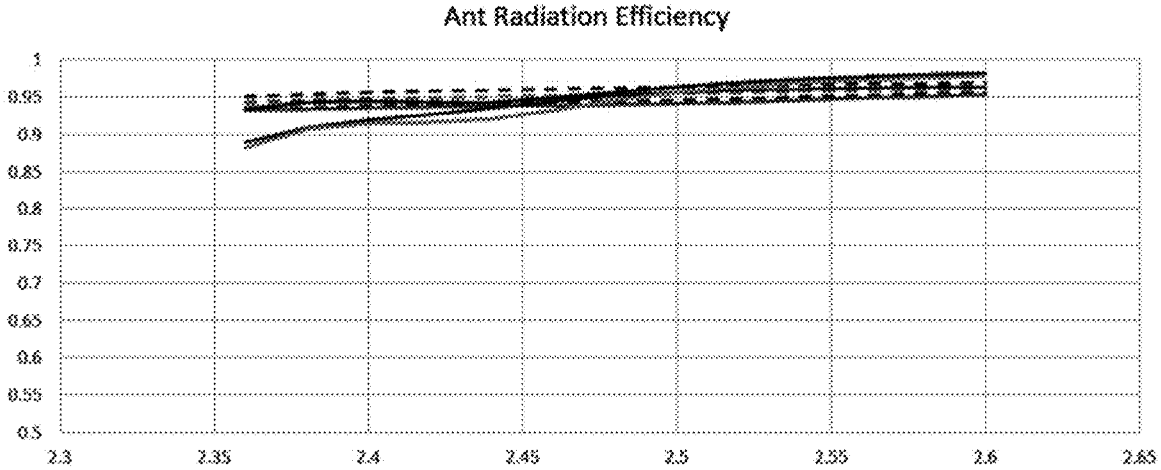
FIG. 18 is a diagram of radiation efficiency of four antennas in an antenna module according to an implementation of this disclosure.

Refer to FIG. 18. The diagram of curves shown in FIG. 18 shows radiation efficiency of four 2.4 G antennas of the antenna module 10 provided in this disclosure. As shown in FIG. 18, there is no radiation efficiency dent on the 2.4 G antenna, and the simulated radiation efficiency is higher than 90% in an operating band of 2.4 GHz to 2.5 GHz.

In the antenna module 10, in a working process of the first decoupling structure and the second decoupling structure, electromagnetic wave energy is received through coupling, and the first decoupling structure and the second decoupling structure also radiate electromagnetic waves. The electromagnetic waves radiated by the first decoupling structure and the second decoupling structure are superimposed with an electric field of a working antenna. The electromagnetic waves radiated by the first decoupling structure and the second decoupling structure affect a radiation pattern of the working antenna. Roundness may be used to express uniformity of a radiation electric field in a tangent plane. The antenna module provided in this disclosure can resolve the problem of isolation and improve the roundness. The roundness is improved, so that radiation energy in all directions of the working antenna can be balanced.

In this disclosure, a range of the cross-sectional height of the first decoupling structure is limited to be between 0.04 times the wavelength and 0.16 times the wavelength, the distance between the first decoupling structure and the first antenna is limited to be between 0.1 times the wavelength and 0.45 times the wavelength, and the distance between the first decoupling structure and the second antenna is between 0.1 times the wavelength and 0.45 times the wavelength. In this way, the impact on the radiation efficiency of the first antenna and the second antenna can be reduced, and isolation between the first antenna and the second antenna is improved in a limited space, so that there is no obvious dent in the simulation diagram of the radiation efficiency of the first antenna and the second antenna.

For specific effects, refer to FIG. 19, FIG. 20, FIG. 21, and FIG. 22. It can be learned that specific isolation and radiation efficiency of the antennas of four specific dimensions are within a proper range. In the four diagrams of curves, a curve dB(S(2,2)) is an echo curve of the first antenna, a curve dB(S(3,3)) is an echo curve of the second antenna, a curve dB(S(2,3)) represents isolation between the first antenna and the second antenna when the first decoupling structure exists, and a curve S23 represents isolation between the first antenna and the second antenna when no first decoupling structure exists.

Figure 19:
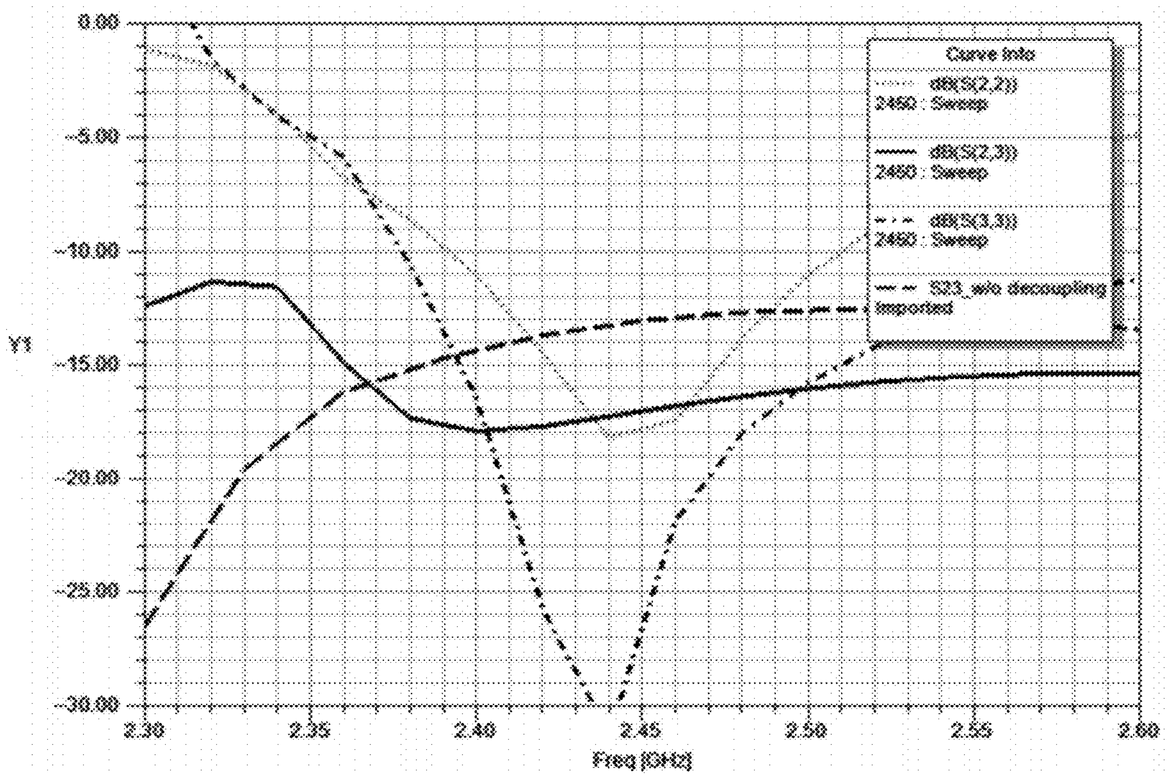
FIG. 19, FIG. 20, FIG. 21, and FIG. 22 each are diagrams of isolation and radiation efficiency of antenna modules of four dimensions.

A specific dimension of the antenna module shown in FIG. 19 is set as follows: A cross-sectional height of the first decoupling structure=0.04 times a wavelength (5 mm), a distance between the first decoupling structure and the first antenna=0.1 times the wavelength (12.2 mm), and a distance between the first decoupling structure and the second antenna=0.1 times the wavelength (12.2 mm).

Figure 20:
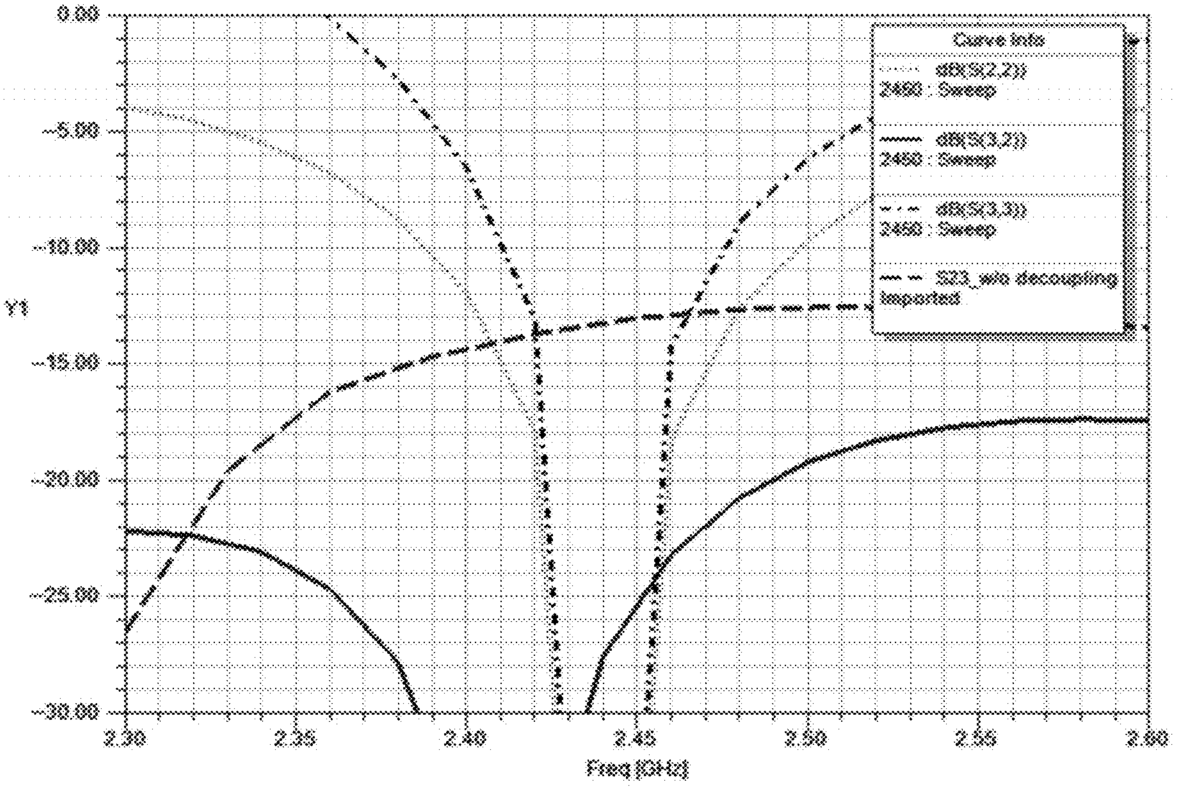

A specific dimension of the antenna module shown in FIG. 20 is set as follows: A cross-sectional height of the first decoupling structure=0.16 times the wavelength (19.6 mm), a distance between the first decoupling structure and the first antenna=0.1 times the wavelength (12.2 mm), and a distance between the first decoupling structure and the second antenna=0.1 times the wavelength (12.2 mm).

Figure 21:
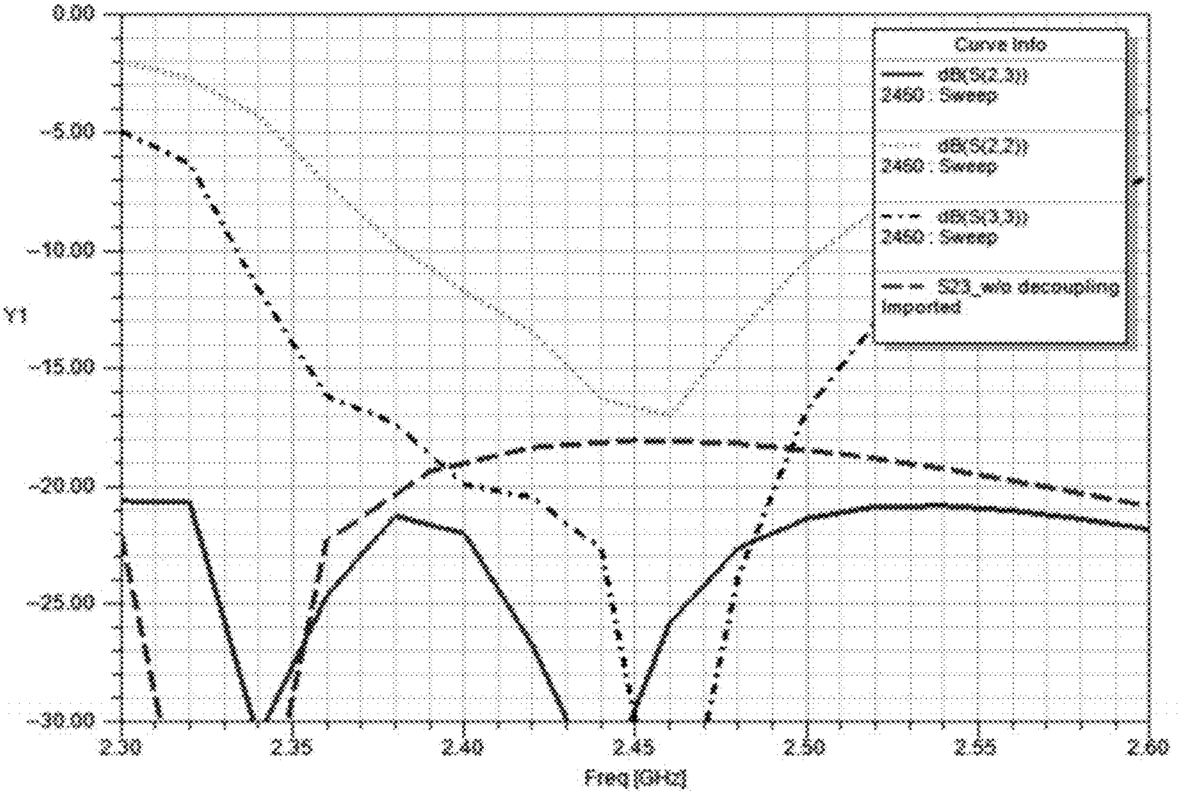

A specific dimension of the antenna module shown in FIG. 21 is set as follows: A cross-sectional height of the first decoupling structure=0.04 times the wavelength (5 mm), a distance between the first decoupling structure and the first antenna=0.45 times the wavelength (55 mm), and a distance between the first decoupling structure and the second antenna=0.45 times the wavelength (55 mm).

Figure 22:
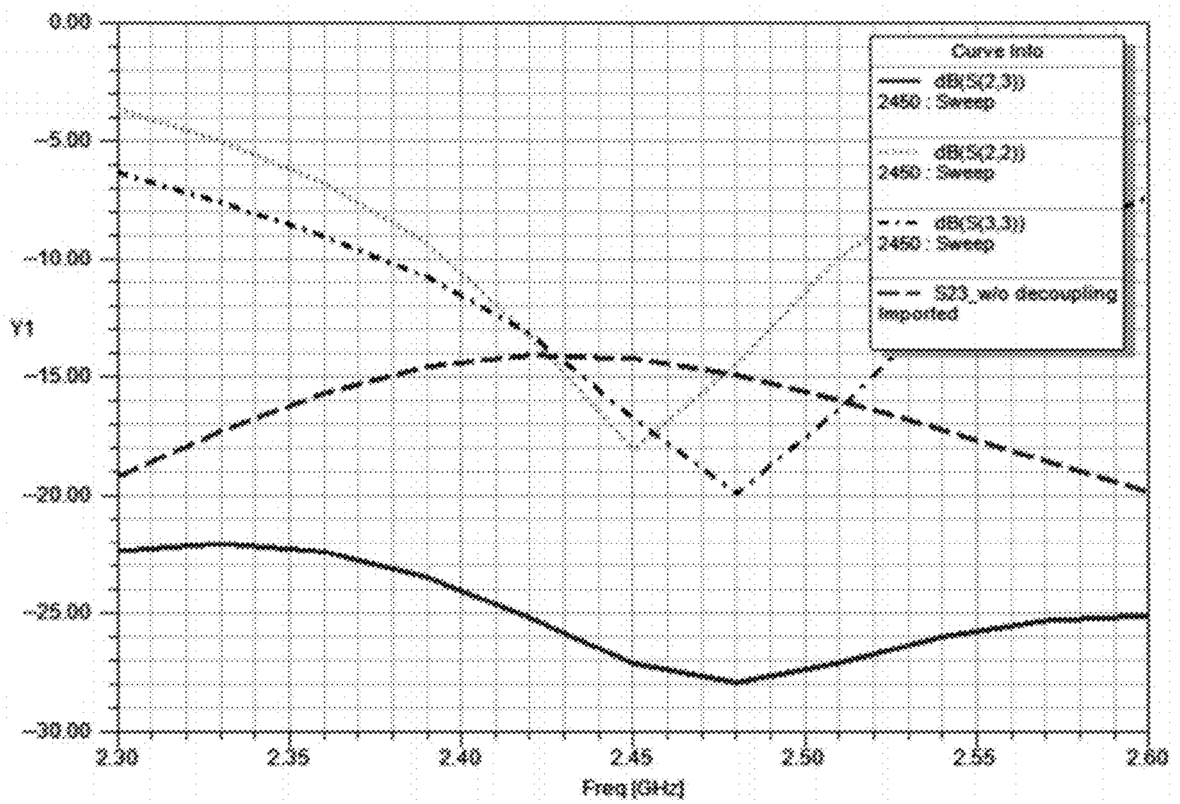

A specific dimension of the antenna module shown in FIG. 22 is set as follows: A cross-sectional height of the first decoupling structure=0.16 times the wavelength (19.6 mm), a distance between the first decoupling structure and the first antenna=0.45 times the wavelength (55 mm), and a distance between the first decoupling structure and the second antenna=0.45 times the wavelength (55 mm).

It can be learned from FIG. 19, FIG. 20, FIG. 21, and FIG. 22 that, in this disclosure, isolation between the first antenna and the second antenna can be improved by disposing the first decoupling structure, and radiation efficiency of the antenna can be ensured.

Finally, it should be noted that the foregoing embodiments are merely intended for describing the technical solutions of this disclosure, but not for limiting this disclosure. Although this disclosure is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this disclosure.

The invention claimed is:

1. An antenna module, comprising:

a ground plane, wherein a direction perpendicular to the ground plane is a first direction; and a first antenna, a second antenna, and a first decoupling structure, wherein the first antenna, the second antenna, and the first decoupling structure are disposed on a same side of the ground plane along the first direction, an operating frequency of each of the first antenna and the second antenna is a first frequency, and a resonance frequency of the first decoupling structure is the first frequency; and in the first direction, a longest distance between the first decoupling structure and the ground plane is a cross-sectional height of the first decoupling structure, the cross-sectional height of the first decoupling structure is between 0.04 times a wavelength and 0.16 times the wavelength, a distance between the first decoupling structure and the first antenna is a first distance, a distance between the first decoupling structure and the second antenna is a second distance, and each of the first distance and the second distance are between 0.1 times the wavelength and 0.45 times the wavelength, wherein the first decoupling structure comprises a ground end, a first stub, and a second stub, the first stub is connected between the second stub and the ground end, an extension direction of the first stub is the first direction, an extension direction of the second stub is different from that of the first stub, and an electrical length from the ground end to a tail end that is of the second stub and that is away from the first stub is 0.25 times the wavelength.

2. The antenna module according to claim 1, wherein a distance between the first antenna and the second antenna is between 0.2 times the wavelength and 0.8 times the wavelength.

3. The antenna module according to claim 1, wherein a first lumped element is disposed between the ground end and the first stub, and the first lumped element is an inductor, a capacitor, and/or a resistor.

4. The antenna module according to claim 1, wherein the antenna module further comprises a second decoupling structure, and a resonance frequency of the second decoupling structure is higher than the first frequency or lower than the first frequency.

5. The antenna module according to claim 4, wherein a frequency difference between the resonance frequency of the second decoupling structure and the first frequency is between 0.03 GHz and 0.33 GHz.

6. The antenna module according to claim 1, wherein the antenna module further comprises a third antenna and a fourth antenna, a radiator of the third antenna is located on a side that is of the first antenna and that is away from the ground plane, a radiator of the fourth antenna is located on a side that is of the second antenna and that is away from the ground plane, an operating frequency of each of the third antenna and the fourth antenna is a second frequency, and the second frequency is higher than the first frequency.

7. The antenna module according to claim 6, wherein a feed structure of the third antenna and the first antenna are disposed on a same circuit board, and a feed structure of the fourth antenna and the second antenna are disposed on a same circuit board.

8. An antenna module, comprising a ground plane and at least two antenna elements that are disposed adjacent to each other and that are located on a same side of the ground plane, wherein architectures of the at least two antenna elements are the same; an antenna element of the at least two antenna elements comprises a first primary antenna and a first decoupling structure; an operating frequency of the first primary antenna is a first frequency; a resonance frequency of the first decoupling structure is the first frequency; in a direction perpendicular to the ground plane, a longest distance between the first decoupling structure and the ground plane is a cross-sectional height of the first decoupling structure; the cross-sectional height of the first decoupling structure is between 0.04 times a wavelength and 0.16 times the wavelength; a distance between the first decoupling structure and the first primary antenna is a first distance; a distance between the first decoupling structure and a first primary antenna of an adjacent antenna element is a second distance; and each of the first distance and the second distance is between 0.1 times the wavelength and 0.45 times the wavelength, wherein the adjacent antenna element is one of the at least two antenna elements and is adjacent to the antenna element, wherein the first decoupling structure comprises a ground end, a first stub, and a second stub, the first stub is connected between the second stub and the ground end, an extension direction of the first stub is the first direction, an extension direction of the second stub is different from that of the first stub, and an electrical length from the ground end to a tail end that is of the second stub and that is away from the first stub is 0.25 times the wavelength.

9. The antenna module according to claim 8, wherein a distance between the first primary antenna and the first primary antenna of the adjacent antenna element is between 0.2 times the wavelength and 0.8 times the wavelength.

10. The antenna module according to claim 8, wherein a first lumped element is disposed between the ground end and the first stub, and the first lumped element is an inductor, a capacitor, and/or a resistor.

11. The antenna module according to claim 8, wherein the first decoupling structure in each antenna element of the at least two antenna elements is connected to a second lumped element, the second lumped element is connected in series between the first decoupling structure and a ground, and configuration values of the second lumped elements connected to different antenna elements are different.

12. The antenna module according to claim 8, wherein each antenna element of the at least two antenna elements further comprises a second decoupling structure, and a resonance frequency of the second decoupling structure is higher than the first frequency or lower than the first frequency.

13. The antenna module according to claim 12, wherein a frequency difference between the resonance frequency of the second decoupling structure and the first frequency is between 0.03 GHz and 0.33 GHz.

14. The antenna module according to claim 9, wherein each antenna element of the at least two antenna elements further comprises a second primary antenna, a radiator of the second primary antenna is located on a side that is of the first primary antenna and that is away from the ground plane, an operating frequency of the second primary antenna is a second frequency, and the second frequency is higher than the first frequency.

15. The antenna module according to claim 14, wherein a feed structure of the second primary antenna and the first primary antenna are disposed on a same circuit board.

16. The antenna module according to claim 12, wherein the antenna element comprises a first circuit board and a second circuit board that intersect each other, the first primary antenna and the first decoupling structure are disposed on the first circuit board, and the second decoupling structure is disposed on the second circuit board.

17. A communication device, comprising a radio frequency chip and an antenna module, wherein the antenna module is electrically connected to the radio frequency chip, and comprises:

a ground plane, wherein a direction perpendicular to the ground plane is a first direction; and a first antenna, a second antenna, and a first decoupling structure, wherein the first antenna, the second antenna, and the first decoupling structure are disposed on a same side of the ground plane along the first direction, an operating frequency of each of the first antenna and the second antenna is a first frequency, and a resonance frequency of the first decoupling structure is the first frequency; and in the first direction, a longest distance between the first decoupling structure and the ground plane is a cross-sectional height of the first decoupling structure, the cross-sectional height of the first decoupling structure is between 0.04 time a wavelength and 0.16 times the wavelength, a distance between the first decoupling structure and the first antenna is a first distance, a distance between the first decoupling structure and the second antenna is a second distance, and each of the first distance and the second distance are between 0.1 times the wavelength and 0.45 times the wavelength, wherein the first decoupling structure comprises a ground end, a first stub, and a second stub, the first stub is connected between the second stub and the ground end, an extension direction of the first stub is the first direction, an extension direction of the second stub is different from that of the first stub, and an electrical length from the ground end to a tail end that is of the second stub and that is away from the first stub is 0.25 times the wavelength.

* * * * *